United States Patent
Harvey

(10) Patent No.: US 9,645,578 B2
(45) Date of Patent: *May 9, 2017

(54) DIRECT METHODS FOR DENSE PARKING OF AUTONOMOUS VEHICLES

(71) Applicant: Thomas Danaher Harvey, Rockville, MD (US)

(72) Inventor: Thomas Danaher Harvey, Rockville, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/043,595

(22) Filed: Feb. 14, 2016

(65) Prior Publication Data

US 2016/0224028 A1 Aug. 4, 2016

Related U.S. Application Data

(60) Division of application No. 14/837,114, filed on Aug. 27, 2015, now Pat. No. 9,298,186, which is a continuation-in-part of application No. 14/611,253, filed on Feb. 1, 2015, now Pat. No. 9,139,199.

(51) Int. Cl.

| G05D 1/02 | (2006.01) |
|---|---|
| G05D 1/00 | (2006.01) |
| B60W 30/06 | (2006.01) |
| B62D 15/02 | (2006.01) |
| E04H 6/42 | (2006.01) |

(52) U.S. Cl.
CPC ........... *G05D 1/0287* (2013.01); *B60W 30/06* (2013.01); *B62D 15/0285* (2013.01); *E04H 6/422* (2013.01); *G05D 1/0027* (2013.01); *G05D 1/0212* (2013.01); *G05D 1/0297* (2013.01); *G05D 2201/0213* (2013.01)

(58) Field of Classification Search
CPC .. B62D 15/0285; E04H 6/422; G05D 1/0297; G05D 1/0212; G05D 1/0287; G05D 1/0027; G05D 2201/0213; B60W 30/06
USPC ......................................................... 701/23
See application file for complete search history.

(56) References Cited

U.S. PATENT DOCUMENTS 5,038,290 A * 8/1991 Minami ............... G05D 1/0291
701/117

* cited by examiner

*Primary Examiner* — Marthe Marc-Coleman

(57) ABSTRACT

A method of controlling autonomous or driverless vehicles in a specific control zone is disclosed. The vehicles enter the zone and come under the control of a zone authority that coordinates the movements of the vehicles until they leave the zone. The behavior of the vehicles is modified to insure that it matches a set of rules established by the zone authority. The zone may be an area such as a bridge, tunnel or construction zone where efficient, possibly single lane, travel requires tight coordination. Other possible zones include parking areas, indoor passages and areas with security concerns. The zone authority simultaneously controls multiple autonomous vehicles and possible additional driver operated vehicles. The messages establishing control or providing continuing administration of rules may be delivered by any type of communications link or may be associated with a device issued to vehicles entering the zone which is collected on exit.

18 Claims, 18 Drawing Sheets

DIRECT METHODS FOR DENSE PARKING OF AUTONOMOUS VEHICLES

CROSS REFERENCE TO RELATED APPLICATIONS

This application is a divisional of application Ser. No. 14/837,114 filed Aug. 27, 2015 now pending which is a continuation-in-part of application Ser. No. 14/611,253 filed Feb. 1, 2015, now U.S. Pat. No. 9,139,199. Each patent application identified above is incorporated here by reference in its entirety except for paragraph [0039] defining "accessing a vehicle" of application Ser. No. 14/611,253, which is not hereby incorporated.

STATEMENT REGARDING FEDERALLY SPONSORED RESEARCH OR DEVELOPMENT

Not Applicable

BACKGROUND OF THE INVENTION

Field of the Present Invention

The present invention relates to a method of operating autonomous vehicles.

Background Concerning the Need for the Current Invention

Use of vehicles requires parking them whenever they are not being loaded, unloaded or moved between locations. The cost of parking spaces is substantial especially in high-density built up areas, and efficiency in use of space is of economic importance. For many activities, availability of sufficient parking space is the critical factor in determining the feasibility of an access strategy.

A vehicle occupying a nominal space of 16×8 feet theoretically occupies 128 square feet of space, and an area of an acre would hold 340 vehicles tightly packed in such spaces. Realistic estimates of the number of vehicles that can park in an acre are less than half of that number in the neighborhood of 150 vehicles. This is because of the need for space for drivers to enter and exit the vehicles and for the vehicles to enter and exit the parking spaces.

It is usually necessary in parking vehicles to be able to access or extract any vehicle at random. If vehicles are parked bumper to bumper in close columns, it is necessary to move other vehicles to access the desired vehicle. This is costly in terms of access delay and in terms of the time and effort necessary. Even parking two rows of cars tightly against a wall is done only when the need is great and the expense of additional space is large.

There are situations where random access is not needed. For example, when cars are being loaded onto a ship or ferry to cross a river or an ocean they are often tightly packed. It may even not be possible for a person to revisit a vehicle to recover a forgotten item until the boat is unloaded vehicle by vehicle after arrival at a destination. In these situations the deck space of the vessel is extremely valuable, and the need for sequential and coordinated loading and unloading is justified. The time expended by drivers and by vessel crew in directing drivers is substantial.

Thus, closely packing vehicles is normally avoided to provide access with a reasonable delay and with reasonable effort on the part of drivers.

Remotely controlled vehicles which require no driver in the vehicle and fully or partially autonomous vehicles which require no driver at all are now known technology and are entering the marketplace. Simultaneous operation of several or many of these vehicles is feasible in a way that it is not for human driven vehicles. The Current Inventive Concept concerns methods for using simultaneous operation of multiple vehicles to perform the access, entrance and exit of vehicles in closely packed arrays.

Technologies Related to Embodiments of the Current Inventive Concept

The technologies listed in this section are well known to practitioners of their respective arts; but any one technology may not be known to a practitioner of the art of another technology. They are useful and are employed in the implementation of specific embodiments of the Current Inventive Concept. They are pointed out here to be available in that implementation.

Remotely controlled model vehicles are widely used by hobbyists. They have as many dimensions of control as is desired by the user based on budget considerations. They are typically used by direct observation by a remote driver. Some have video links to give information to the user for driving or simply for observation.

Tracked or guided autonomous vehicles are used in industrial situations. They may follow various guidance methods with fixed guidance devices in their paths. They may accept dynamic orders for destinations from central controllers.

Autonomous vehicles for use on public roads are at the prototype stage of development. They use a rich array of sensors and complex algorithms to control their paths. They have self contained computers to implement their functions.

Communication links to vehicles of many kinds are commonplace. They may set destinations by methods as simple as calling the cell phone of a driver to tell that driver where the vehicle should go. Other links monitor conditions.

BRIEF SUMMARY OF THE INVENTION

A method of moving, rearranging or accessing autonomous vehicles in a parking area is described herein. The vehicles, which may be in at least two columns of two vehicles each, are spaced closely. The method works by computing a set of movements of some of the vehicles, transmitting the movements to the vehicles and commanding the vehicles to move in accordance with the movements transmitted. The movements are coordinated by the central computer that computes the movement set.

The movements can involve moving multiple vehicles. It can by shuffling vehicles in columns in a cyclical manner by moving vehicles from one end of a column to other end of that column or an end of another column. In some cases the shuffle can involve one or more vehicles exiting the array in an open shuffle where vehicles return to a column other than the one left.

The movements can involve moving vehicles in one or more columns to create an access lane or temporary aisle to allow access to a particular or multiple particular vehicles. This can be for loading or unloading purposes. Vehicles can also be removed from the array and other vehicles can be put in the space vacated or a space made available by moving vehicles into the space vacated.

Also claimed is a method of controlling operation of autonomous vehicle in a zone with a zone authority by creating a system of zone rules coordinating the simultaneous action of vehicles in an area were multiple autonomous vehicles are admitted. The vehicles are admitted to the zone and a message to the vehicles establishes control over the vehicles by the zone authority. One or more messages instruct the vehicles in following the zone rules.

The vehicles admitted to the zone can be limited to those capable of receiving messages from the zone authority and following the zone rules. A vehicle can also be given a communication device to receive the messages by the zone authority.

Driver operated vehicles can also be controlled by the claimed methods when admitted to a zone with at least one autonomous vehicle. In that case a communication device on the driver operated vehicle received a message with information to be used by the driver of the vehicle to follow the zone rules.

Figure 1:
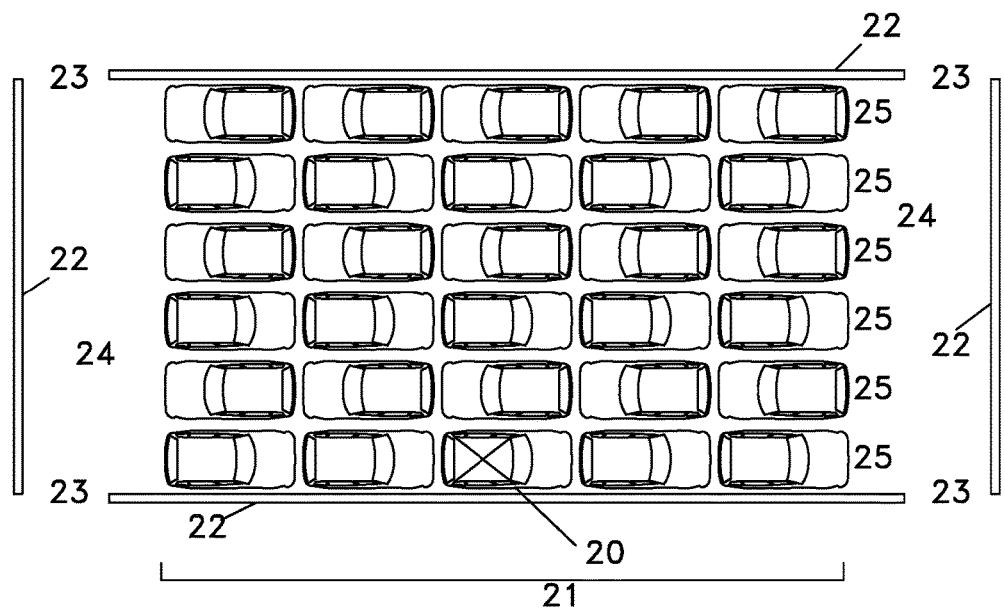
FIGS. 1 to 19 appear in the parent application. Higher numbered figures are introduced in this application.

The features and advantages of the various embodiments disclosed herein will be better understood with respect to the drawing in which:

FIG. 1 is a plan view of a parking area with a selected vehicle to be accessed.

Figure 2:
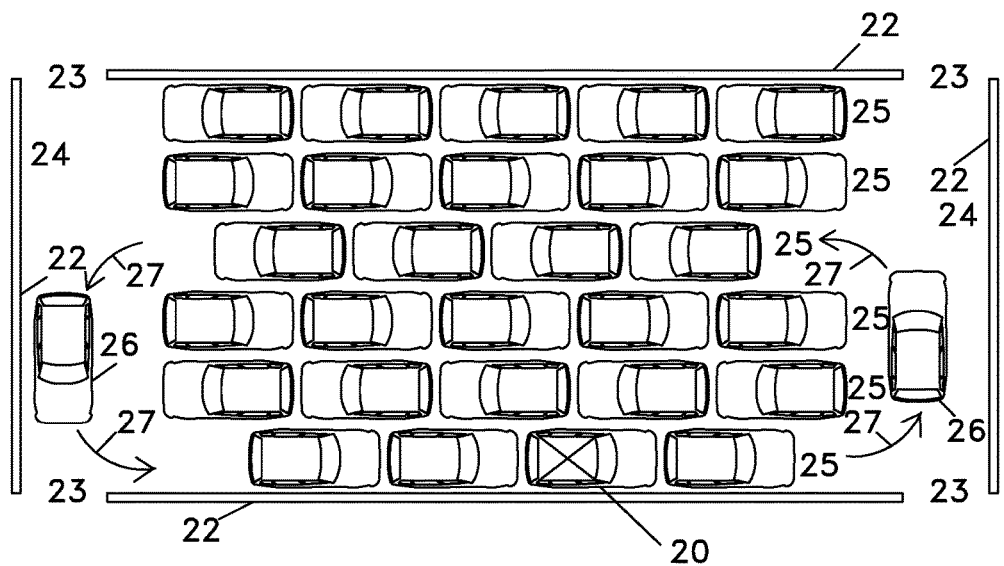

FIG. 2 is a plan view of the parking area of FIG. 1 with a cyclic shuffle step in progress.

Figure 3:
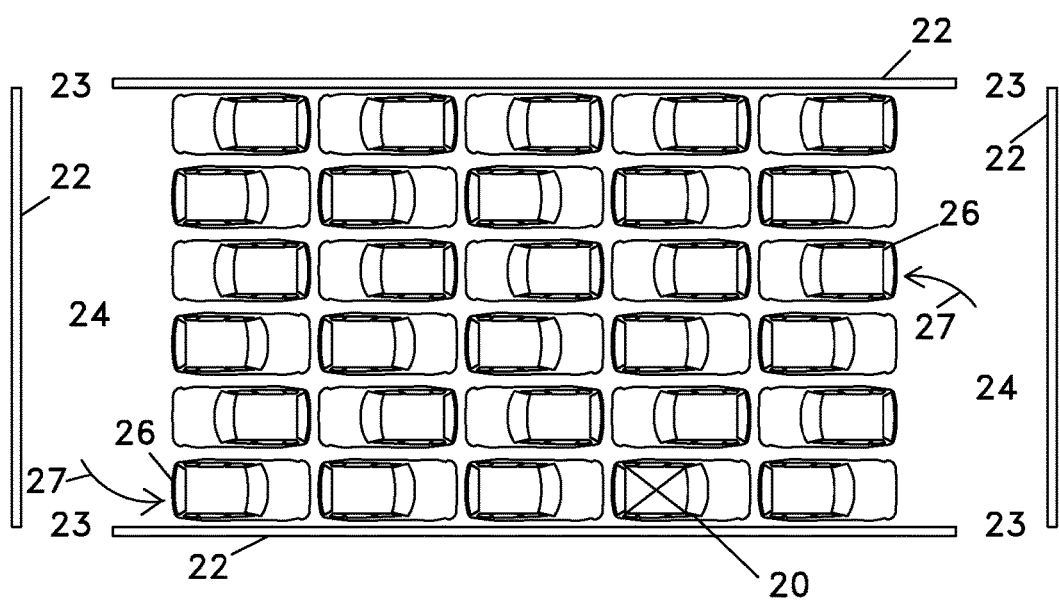

FIG. 3 is a plan view of the parking area of FIG. 1 with a cyclic shuffle step completed.

Figure 4:
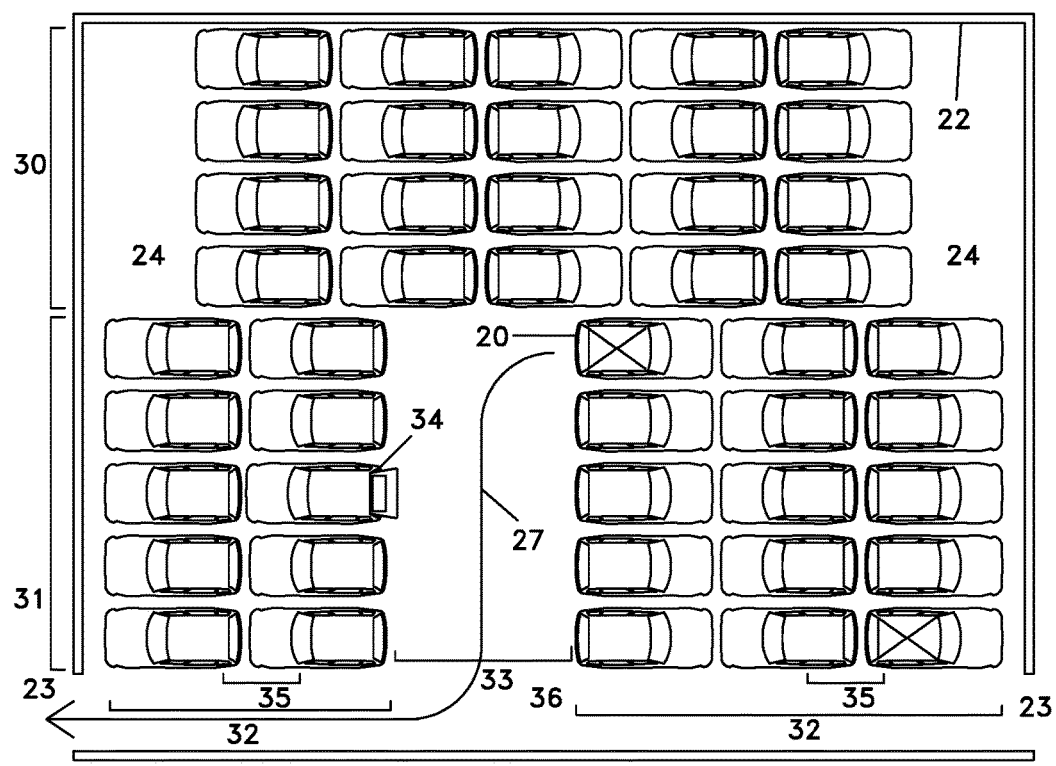

FIG. 4 is a plan view of a parking area showing vehicles parted for temporary aisle exit path. The parting is also shown as a method of accessing vehicles for loading while still in an array.

Figure 5:
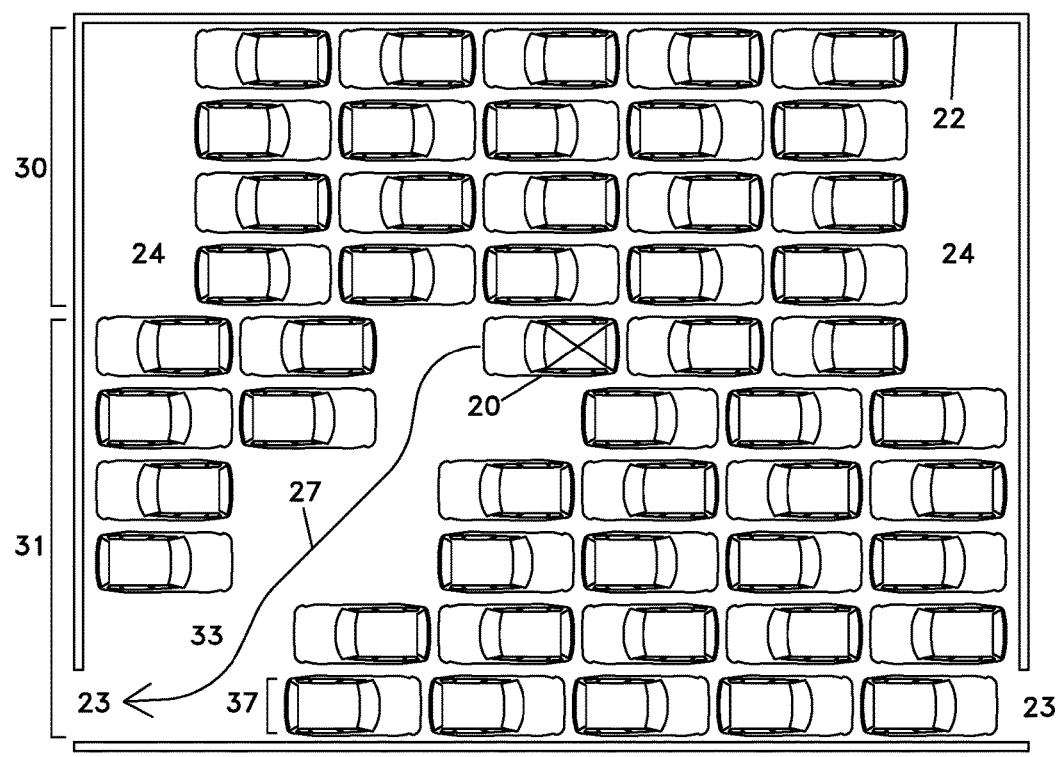

FIG. 5 is a plan view of a parking area showing vehicles parted for a diagonal exit path.

Figure 6:
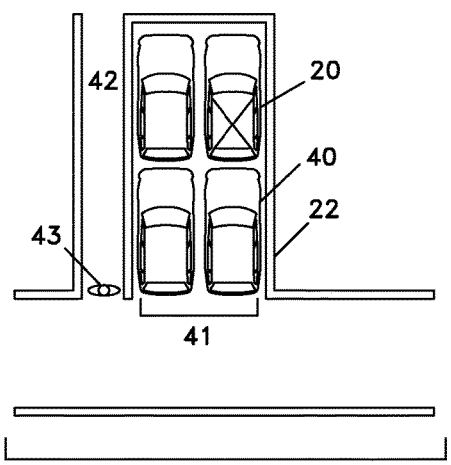

FIG. 6 is a plan view of a simple parking array with only four vehicles and central processing in a vehicle.

Figure 7:
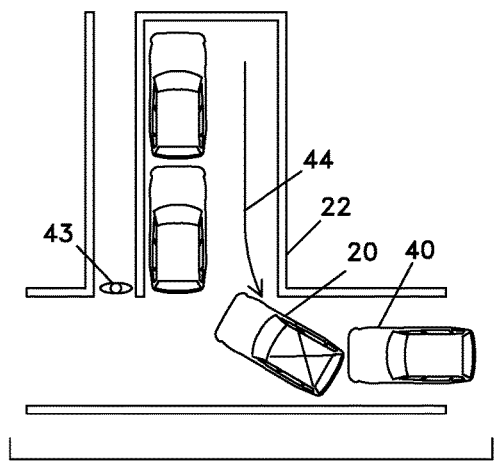

FIG. 7 is a plan view of the array of FIG. 6 after a request to access a vehicle is partially processed and movements are partially made.

Figure 8:
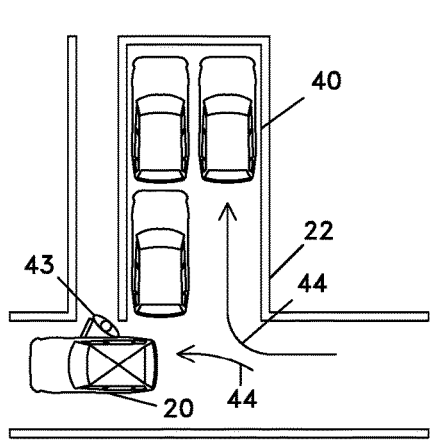

FIG. 8 is a plan view of the array of FIG. 6 after a request to access a vehicle has completed movements and the vehicle is ready for access.

Figure 9:
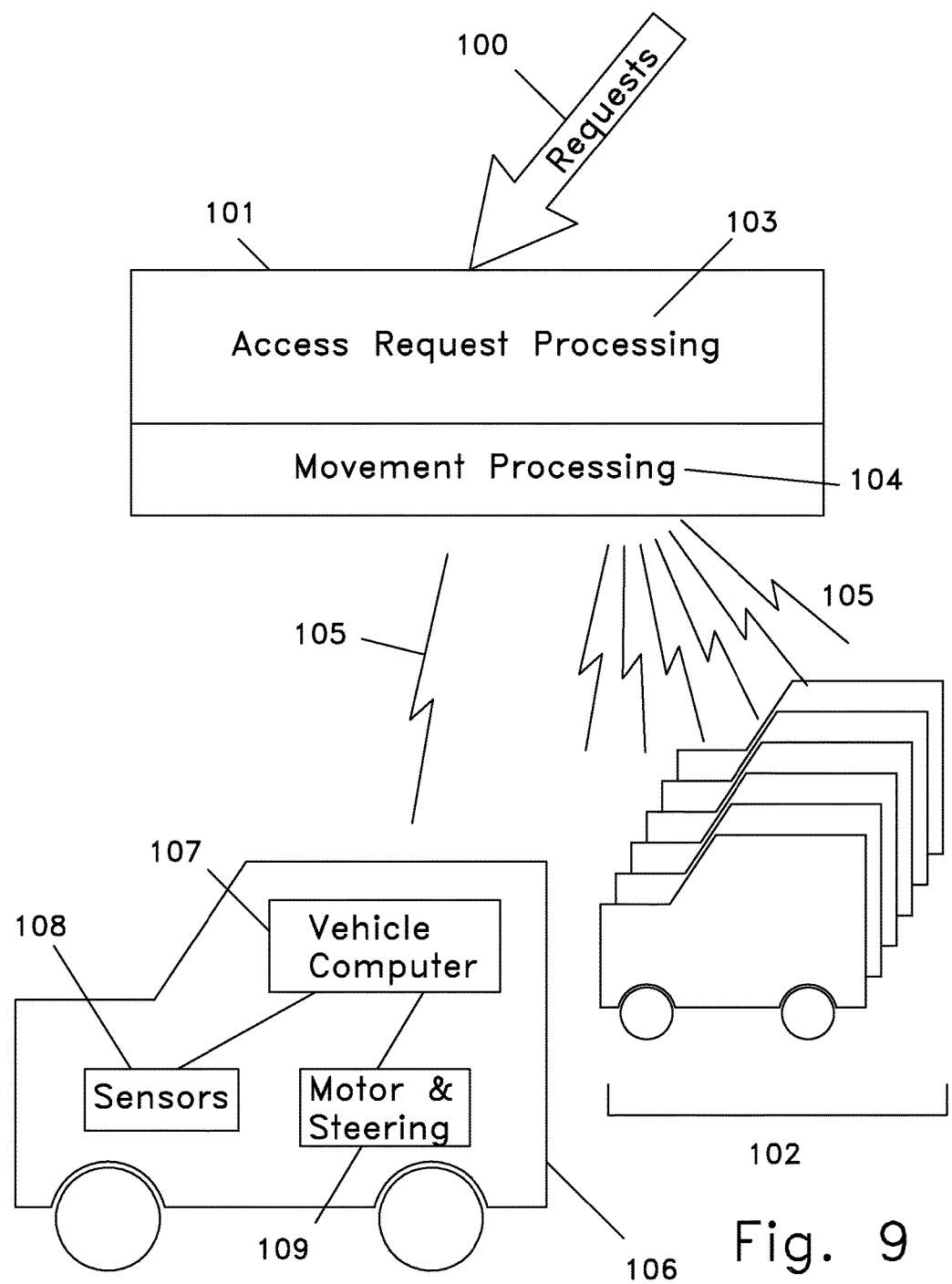

FIG. 9 is a block diagram showing the relation of the central processing, the control network and the vehicles to be controlled.

Figure 10:
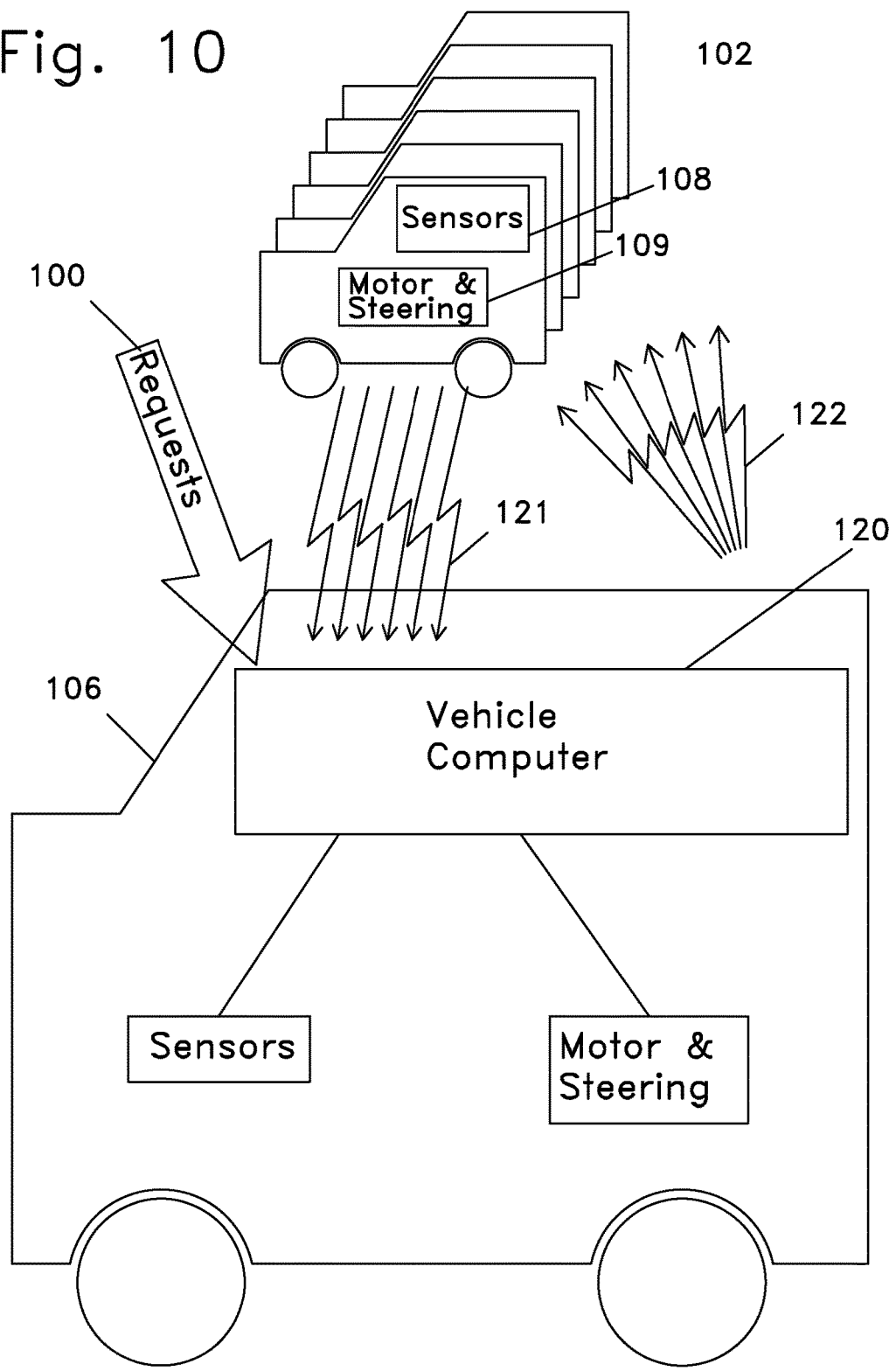

FIG. 10 is a block diagram showing the relation of components in an embodiment with central processing in a vehicle and sensors in vehicles transmitting to the central computer.

Figure 11:
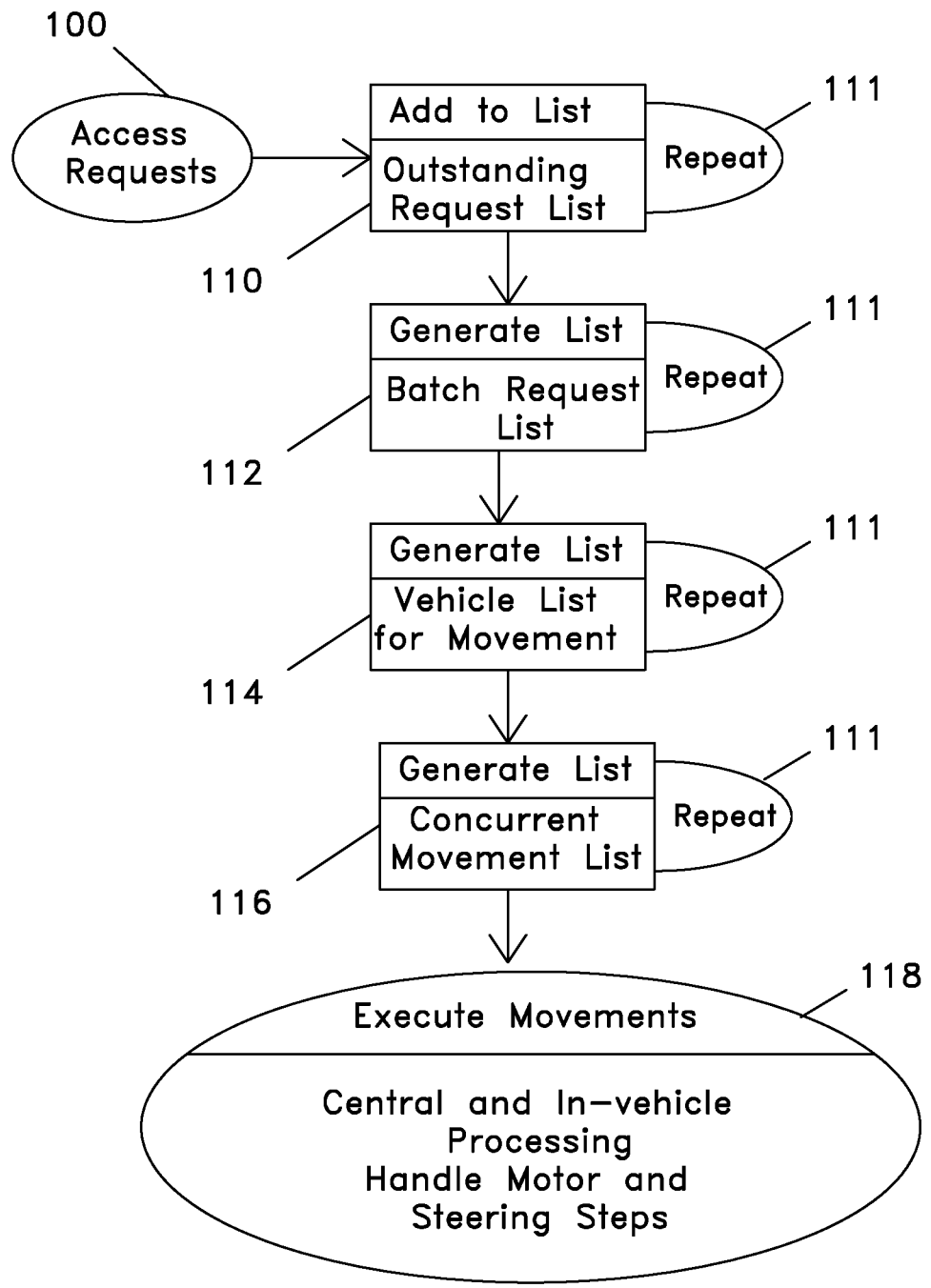

FIG. 11 is a diagram showing the relationship of sets of entities to be created as the task of accessing a vehicle or vehicles is being broken down into movements.

Figure 12:
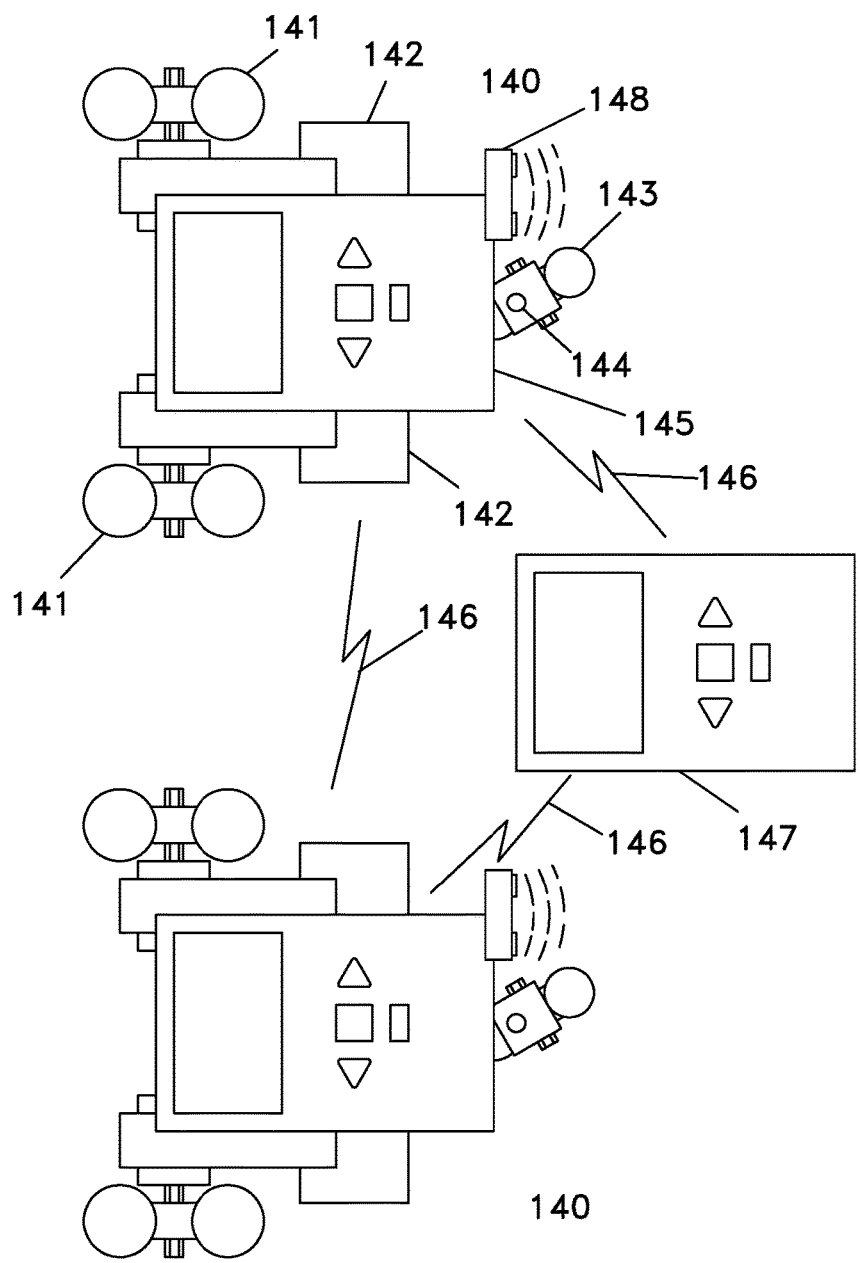

FIG. 12 is a plan view of the two vehicles to be built from kits in a small scale embodiment with an additional computer for use as a remote control.

Figure 13:
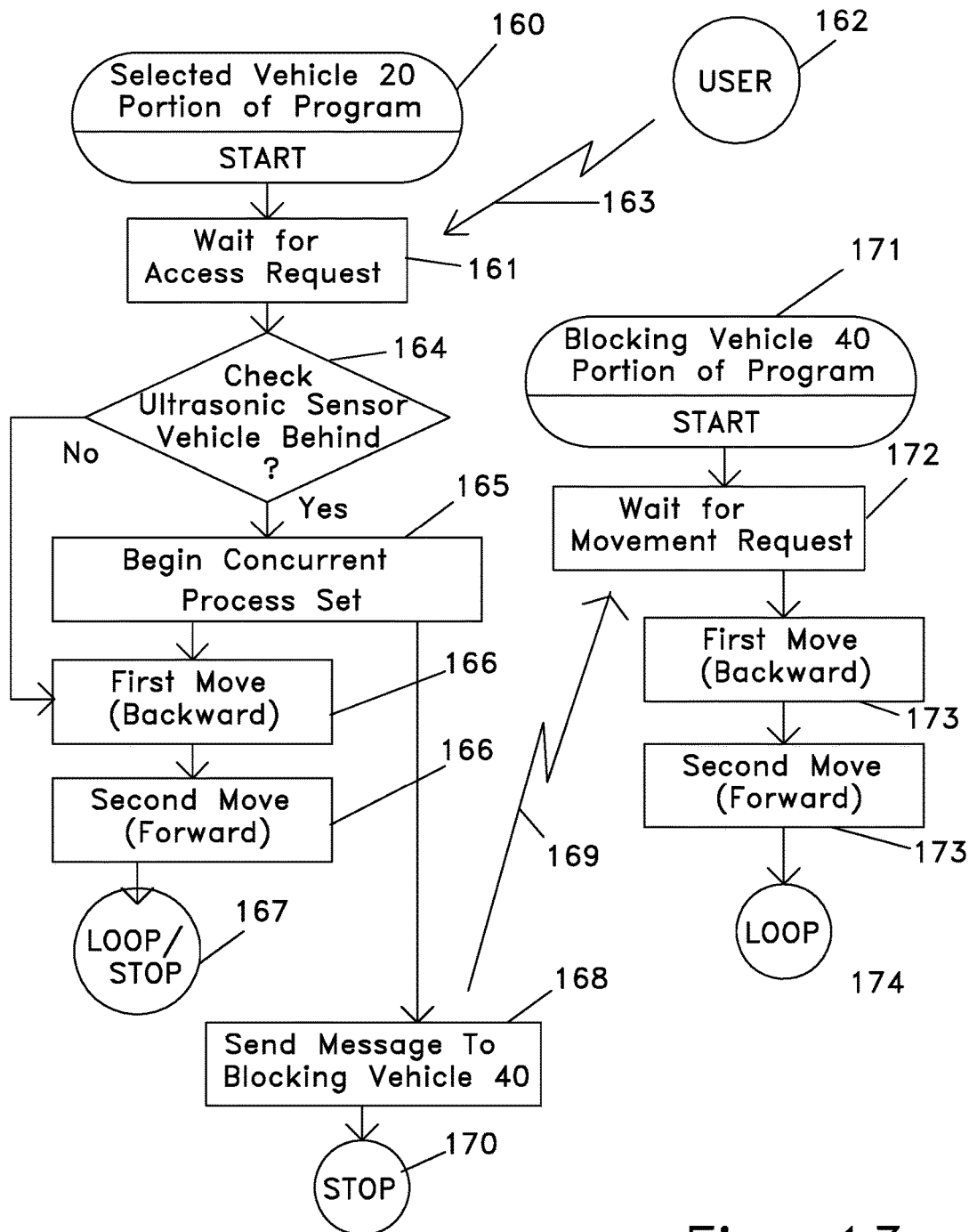

FIG. 13 is a flow chart of the programming steps for a small scale embodiment.

Figure 14:
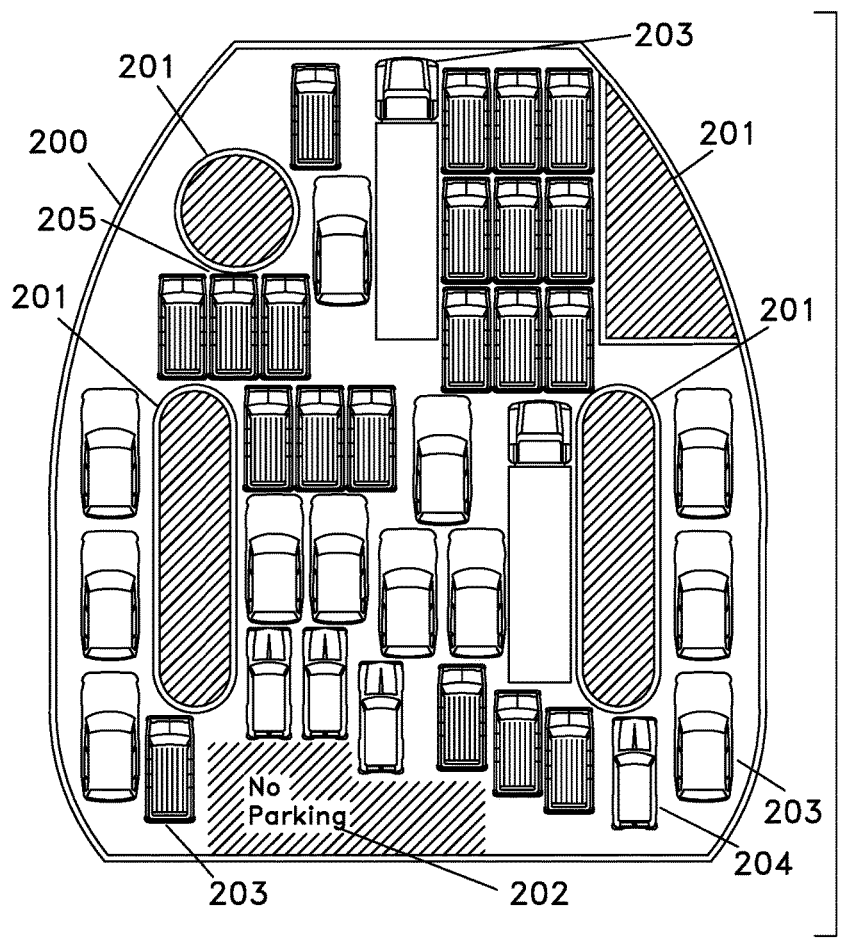

FIG. 14 is a plan view of an embodiment of vehicles as loaded on a ferry or ship.

Figure 15:
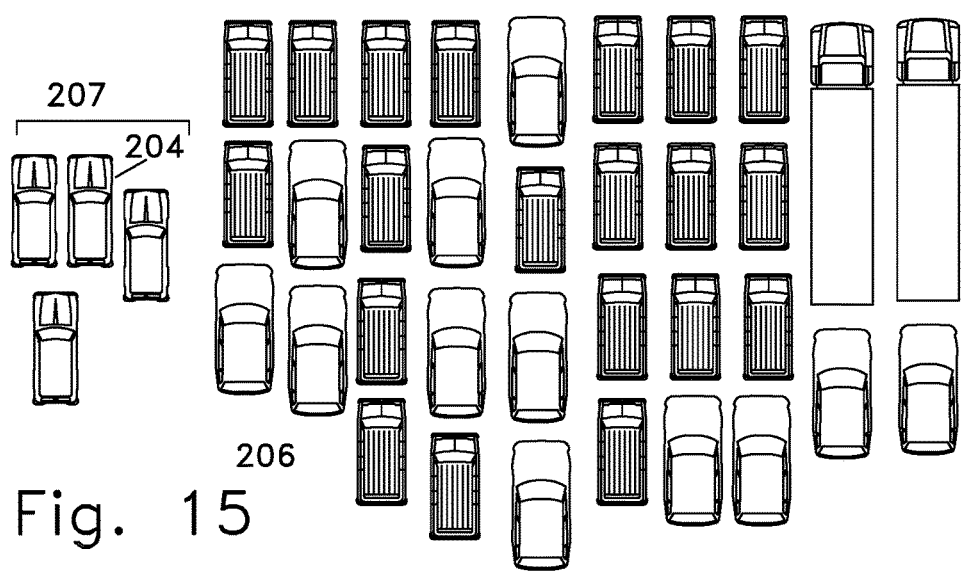

FIG. 15 is a plan view of vehicles ready to be loaded on a ferry or ship.

Figure 16:
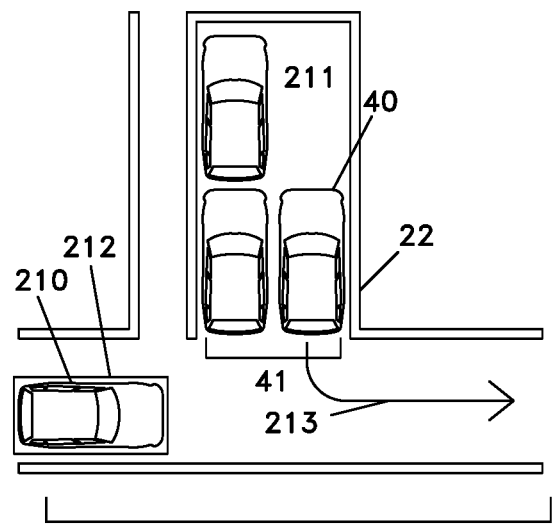

FIG. 16 is a plan view of a small scale embodiment receiving an arriving vehicle.

Figure 17:
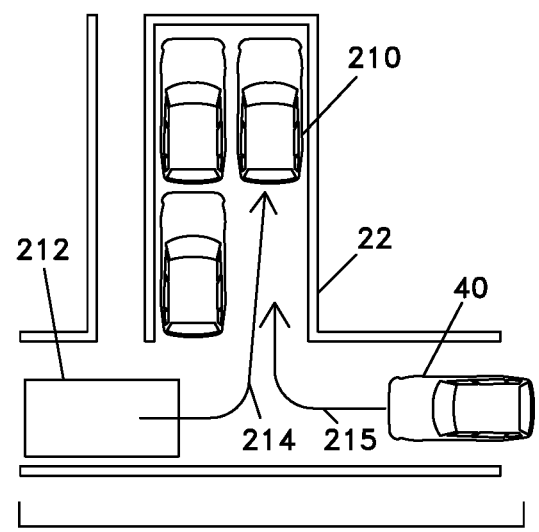

FIG. 17 is a plan view of a small scale embodiment finishing receiving an arriving vehicle.

Figure 18:
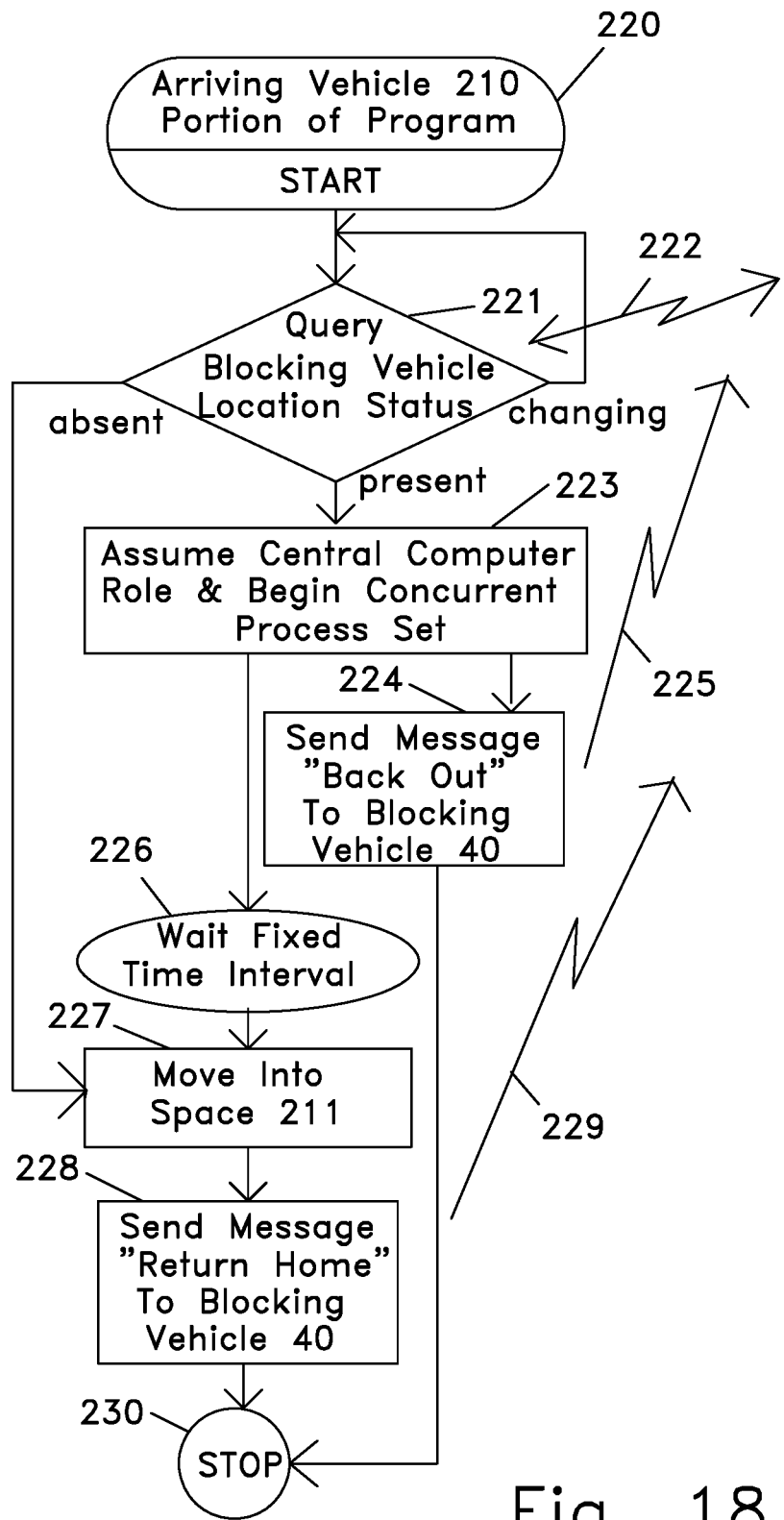

FIG. 18 is a flow chart of the programming steps for a vehicle to be received in a small scale embodiment.

Figure 19:
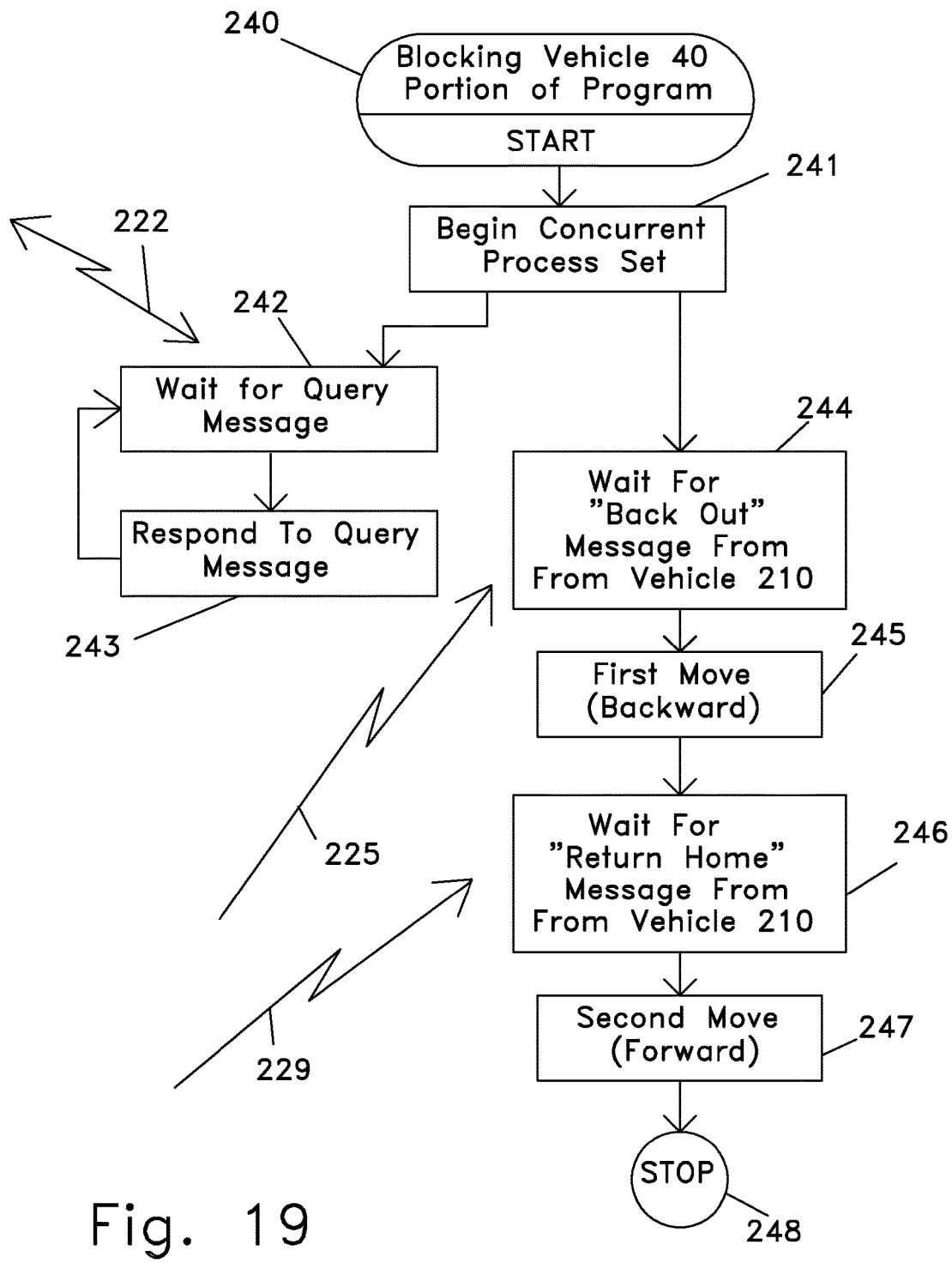

FIG. 19 is a flow chart of the programming steps for a blocking vehicle in a small scale embodiment.

Figure 20:
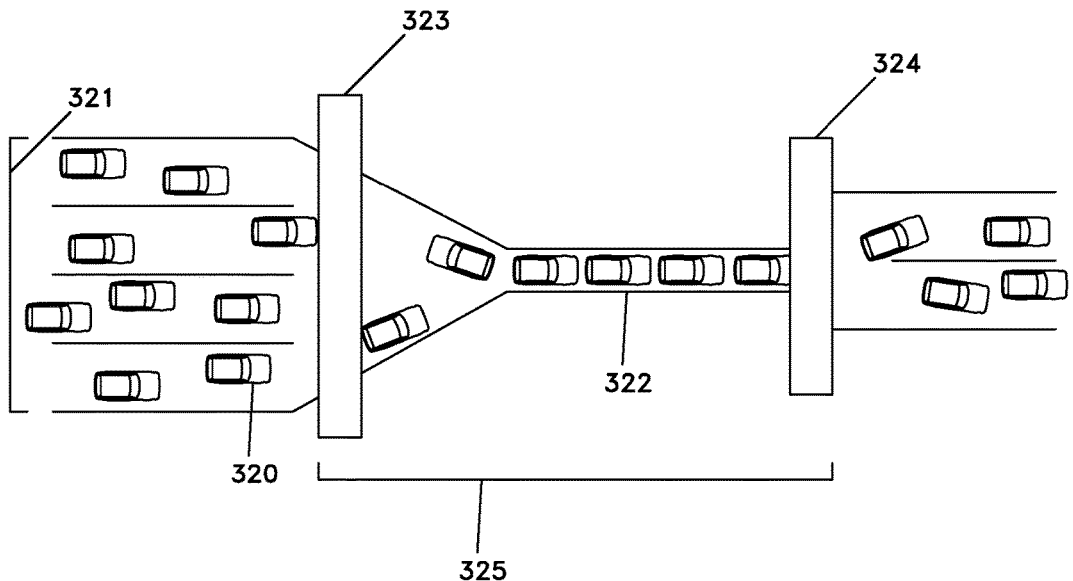

FIG. 20 is a plan view of a simple embodiment of the invention of the disclosure which shows control of a stream of vehicles through a single lane restriction.

Figure 21:
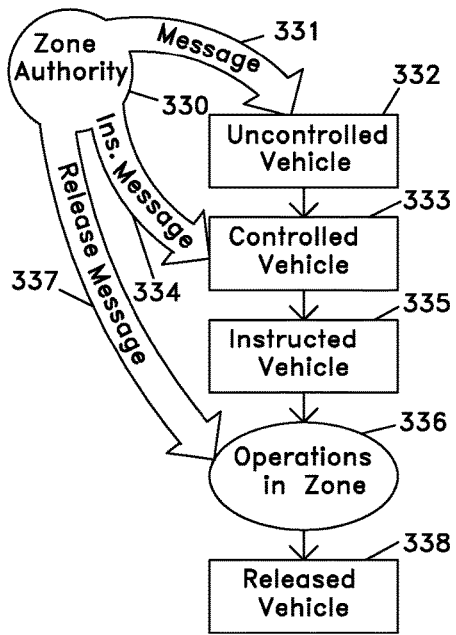

FIG. 21 is a diagram which shows the information flow for autonomous operation in the controlled zone.

Figure 22:
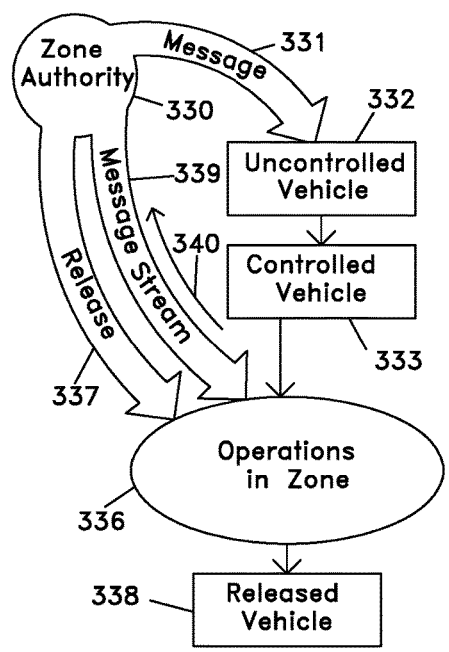

FIG. 22 is a diagram which shows the information flow for operation in the controlled zone with continuing control by the zone authority.

Figure 23:
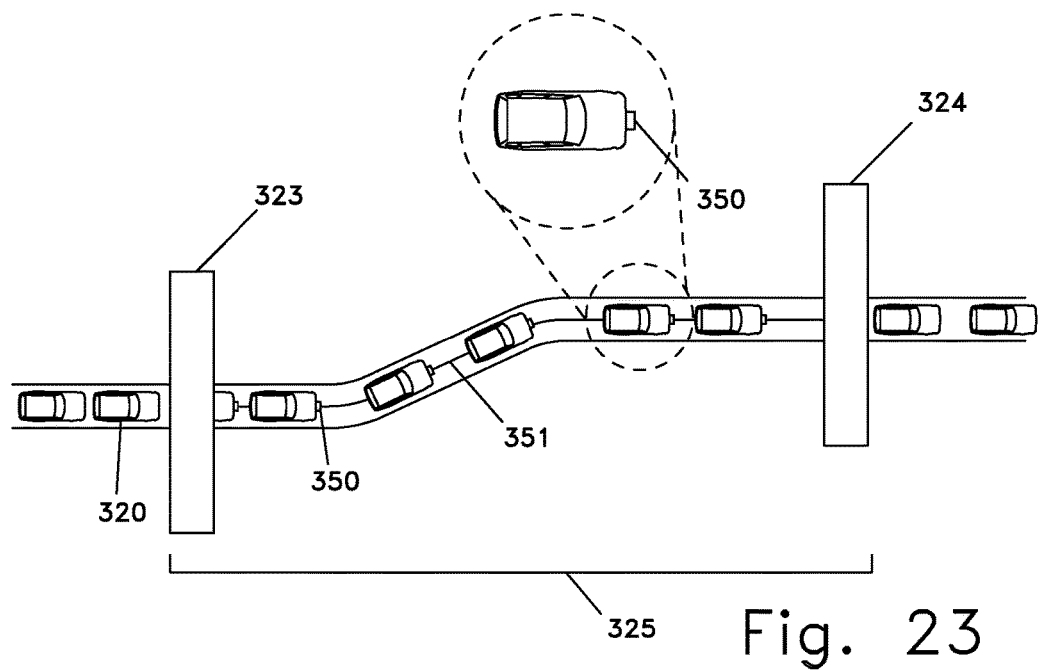

FIG. 23 is a plan view of an embodiment of the invention of the disclosure which shows operation with a zone operator provided communication and operational device.

Figure 24:
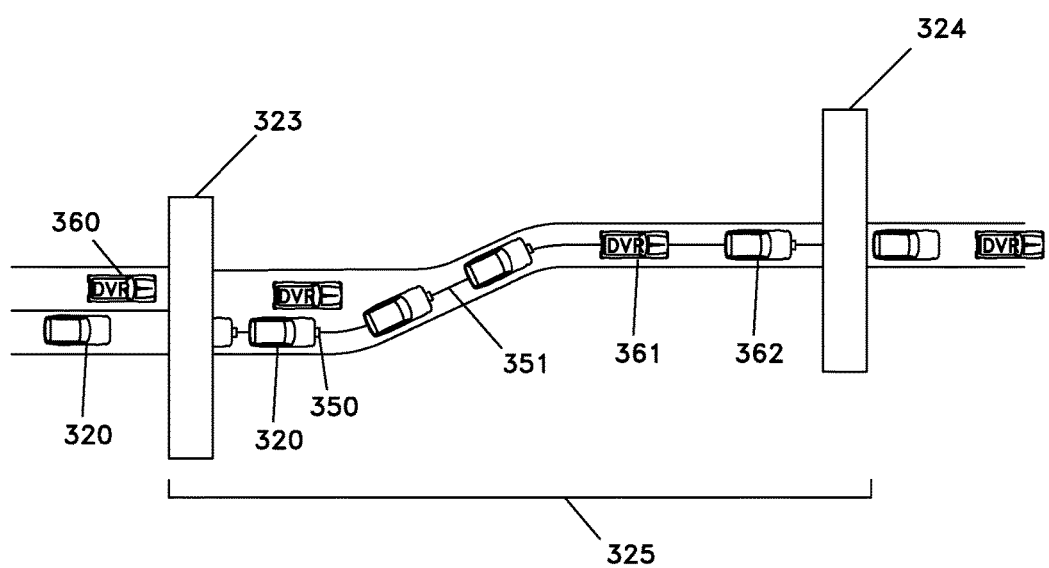

FIG. 24 is a plan view of an embodiment of the invention of the disclosure which shows operation with the addition of controlled driver operated vehicles to automated vehicles.

Figure 25:
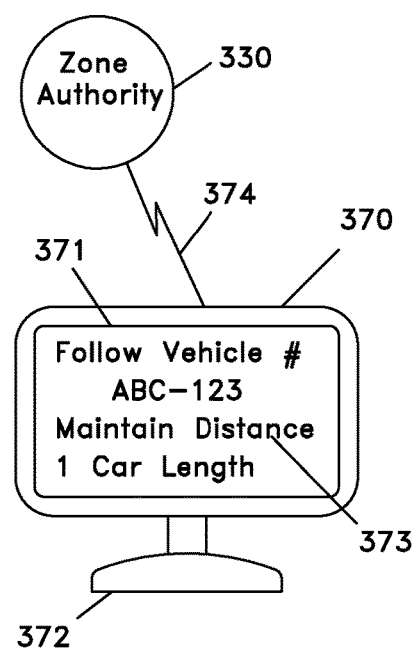

FIG. 25 shows a display and communications device to be supplied to driver operated vehicles by the zone operator.

Figure 26:
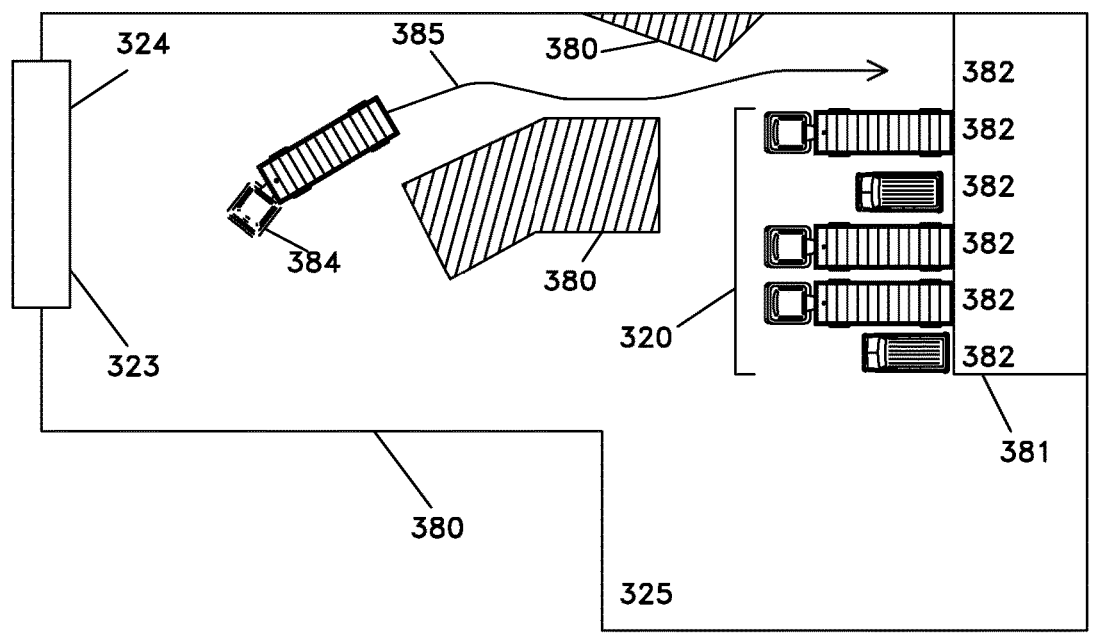

FIG. 26 is a plan view of an embodiment of the invention of the disclosure which shows operation in an indoor loading area.

Figure 27:
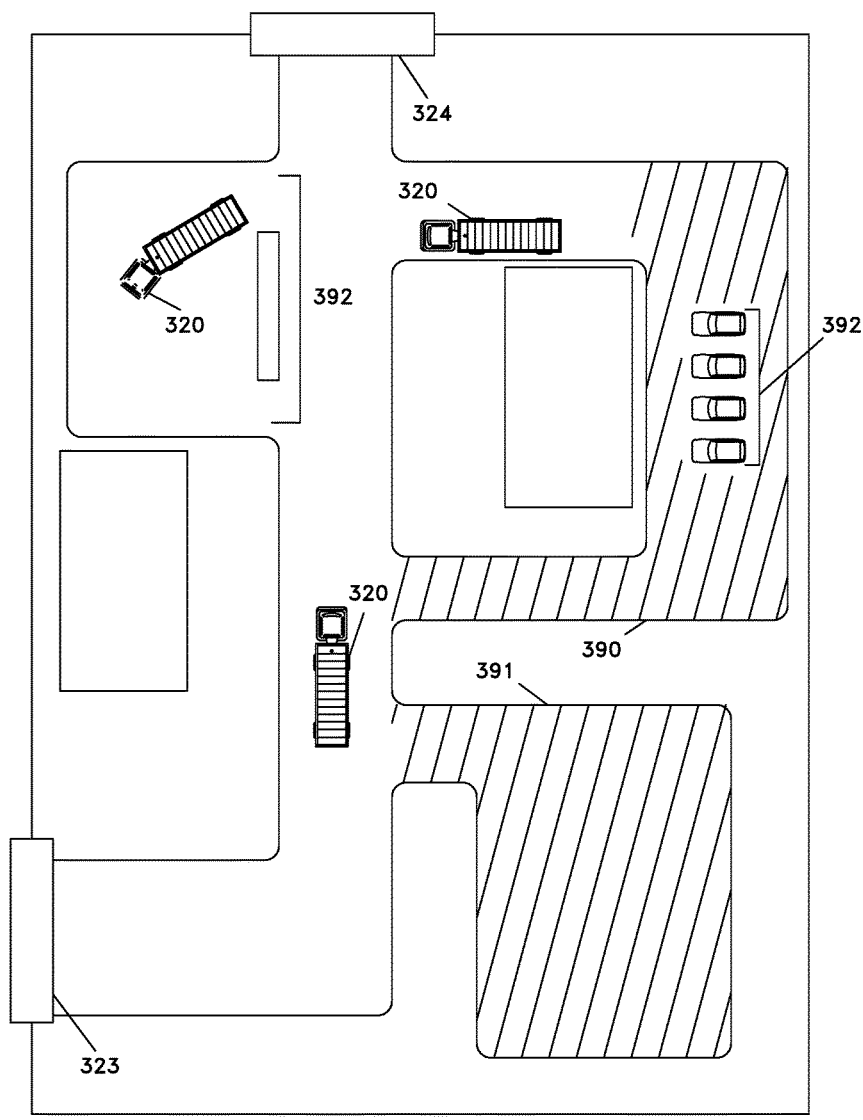

FIG. 27 is a plan view of an embodiment of the invention where the control rules allow access to limited areas for security purposes.

DETAILED DESCRIPTION OF THE INVENTION AND EMBODIMENTS

Incorporation by Reference

United States Patent Application Publication No. 2015/0149022 A1 to Harvey, published May 28, 2015, titled Methods for Dense Parking of Remotely Controlled or Autonomous Vehicles, and publishing application Ser. No. 14/611,253 filed Feb. 1, 2015 is hereby incorporated by reference.

This and all other referenced patents and applications are incorporated herein by reference in their entirety expect as specifically excepted herein. In particular, paragraph [0041] of publication 2015/0149022 is not incorporated herein and the definition of "Accessing a vehicle" of that paragraph does not apply either within the publication or in this application. Furthermore, where a definition or use of a term in a reference, which is incorporated by reference herein, is inconsistent or contrary to the definition of that term provided herein, the definition of that term provided herein applies and the definition of that term in the reference does not apply.

In general, material from here to paragraph [0128] appears in the parent application and this continuation in part has added description beginning at paragraph [0128].

Definitions

The definitions given in this section are intended to apply throughout the specification and in the claims.

An autonomously driven vehicle is a vehicle which makes movements decided by a non-human decision system that is part of the vehicle. These movements may be done in the implementation of a received command to make a larger scale movement.

An autonomously directed vehicle is a vehicle which receives and executes without human action commands to make a sequence of movements. The received command may contain sufficiently detailed information to completely define the movements or details of the exact movement may be supplied by sensors and results of processing equipment that is part of the vehicle.

Autonomous vehicles include both autonomously driven vehicles and autonomously directed vehicles. It should be noted that the computer operating an autonomous vehicle is not necessarily able to solve the many problems for use of a vehicle on public roads, but is only required to be able to command a movement or sequence of movements without human action in executing the command. Autonomous vehicles are also referred to as driverless vehicles.

A central computer is an information processing device which directs or coordinates movements of multiple vehicles. It can be located in the vehicle storage or parking facility, remotely or in one of the vehicles.

A column of vehicles is a single vehicle or a group of vehicles in tandem. The vehicles, if more than one, are spaced substantially in the longitudinal direction, forward or backward from each other. The vehicles may not be precisely aligned in the lateral dimension. It is sufficient if they overlap enough to limit motion of at least one vehicle in the column.

A cyclical shuffle is a rearrangement of the vehicles in a parking area or areas by moving vehicles from the front of each of one or more columns of vehicles, moving the remaining vehicles forward in their respective column or columns and placing the vehicles removed from the columns in the back of the columns.

A marker is a device which is to be the target of a measurement or detection from a sensor. It may be optical or electronic or work in some other way. Markers include paths marked on surfaces by any means including painted lines and cables emitting electromagnetic signals. A marker can be in a fixed position or on a vehicle.

An open shuffle is a rearrangement of the vehicles in a parking area or areas by moving vehicles from the front of each of one or more columns of vehicles, removing one or more of the moved vehicles from the parking array, moving the remaining vehicles in the columns forward in the their respective column and placing any remaining vehicles removed from the columns in the back of the columns.

Parted vehicles are vehicles in a parking array that have been moved to create an aisle or path for passage of a vehicle being moved or for access by a user.

A row of vehicles is a group of one or more vehicles side by side.

A selected vehicle is one that is to be accessed. There are often multiple selected vehicles.

A vehicle control network is a communications network allowing a central vehicle control computer to command coordinated movements of multiple vehicles. It may only give destination information for relatively short movements of vehicles or it may handle two way detailed control of actuators and sensors in the vehicles.

Description of the Preferred Embodiment

Some of the many embodiments are here described in greater detail to give clearer understanding of the inventive concept and to show the inventors preferred mode of employment of that concept.

A situation is envisioned where a fleet of small autonomous vehicles are stored in an area with a high cost of space, such as in a city center, and used to make deliveries over nearby areas. The vehicles are parked in an array of closely spaced columns. Some of these columns are too closely spaced to allow access by drivers, the cargo or loading machines or personnel. Some vehicles in the columns are parked bumper to bumper so that only the first and last vehicles in the columns can move. There are access aisles at the ends of the columns leading to exits from the vehicle storage area. This situation is illustrated in FIG. 1.

First, consider a requirement to extract a random selected vehicle 20 from the array. If this is the only vehicle required to be accessed, a strategy here called cyclic shuffling can be employed. One or more columns are selected and one end of each column is designated as the front. Vehicles are moved from the front of a column, the remaining vehicles in the column are moved forward and a vehicle from the front of a, same or different, column is put in the back of the column. This is especially effective if columns facing in opposite directions are employed to allow a short movement for the vehicle being moved. The process is illustrated in FIGS. 1-3 in the simple case of employment of a pair or columns. This process, if performed twice, brings selected vehicle 20 to the end of the column from which position it can leave the array.

Next, consider that the requirement is to access several vehicles. Efficient access for exit of the several vehicles can be achieved by cyclic shuffling with selected vehicles in multiple columns of a specific shuffle pattern. When a vehicle to be accessed reaches the end of its column, it can exit and if necessary more shuffle movements can be made. A process to access multiple vehicles under the control of a central computer can select the columns to include in a shuffle pattern to access multiple vehicles efficiently.

Many other patterns to manipulate the vehicles in an array exist. A sophisticated planning algorithm may be implemented on the system's central computer use much more complex patterns than those of cyclic shuffling.

If it is desired to preload cargos into many vehicles in an array before accessing the vehicles for exit, a strategy of forming temporary access aisles may be appropriate. The central computer can split columns and move the portions of the vehicles in opposite directions. This is illustrated in FIG. 4, where five columns 31 are split into subcolumns 32. The resulting temporary aisle 33 allows access to two vehicles in each original column for loading of cargo. Moving vehicles within the space of the original columns twice more allows access to all vehicles in the original columns at other temporary access aisles 35.

Description of an Alternate Embodiment

A parking requirement is envisioned with a small business serving a stream of autonomous vehicles bearing customers for the business. The business in located in an area where space is expensive and has use of a limited parking area which is able to store only four vehicles in two closely spaced columns of two vehicles in tandem. The situation is shown in FIGS. 6 to 8 of the Drawing. The vehicle under autonomous control discharges the passenger at the entrance to the walkway 42 to the business and parks in the array 41.

All vehicles which are permitted to use the parking array are enabled to communicate in a vehicle control network and be controlled by a central computer, which can be a computer in one of the controlled vehicles or in another location but is here assumed to be in the subject vehicle 20. In the specific embodiment being described, vehicles in the parking array use the sensors 108 (see FIG. 10) provided as part of their autonomous driving equipment to determine their own location and locations of other vehicles and transmit that information to the central computer in the subject vehicle 20. The central computer computes and creates a mapping of the relative and absolute locations of vehicles to use in calculating movements.

Description of Components of the Methods in Various Implementations Herein Contemplated.

The central computer 101 is used in various implementations to accept requests for access. The requests are accumulated until a batch is formed. A batch may consist of all the requests pending or a subset based on the results of an algorithm which considers urgency of request, type of request, efficiency of the batch composition for simultaneous movements or other factors in combination. Further algorithms compute a set of movements for the vehicles that will result in the desired accesses. The movements are communicated to the vehicle control systems of each vehicle for execution. The movements may be transmitted in batches, movement by movement or in even smaller increments that combine to compose movements.

Sensors to track the current location of vehicles are used in many possible implementations to provide feedback to the central computer. They may detect presence of other vehicles or make measurements of distances from the vehicle with the sensor to another vehicle or a maker provided in the parking area. The measurements or other information provided by the sensors can be transmitted to the central computer. Some possible implementations may work in an open loop mode and rely on vehicles becoming located in the position resulting from successful execution of a commanded movement. Other implementations may use a closed loop mode and correct the position considered by the central computer as current in projecting movements based on feedback from sensors.

Sensors located on vehicles can be used in various ways. The communication path from a vehicle to the central computer may be bidirectional and return to the central computer information based on the sensors. In another mode of operation the sensors may be used to allow the vehicle to perform operations transmitted in a high level form from the central processor by handling details and sub motions autonomously. The information from vehicle sensors located in multiple vehicles may be coordinated by the central processor to form an overall location model of a part of the vehicle array or the entire vehicle array. For example, a vehicle which is designed to function autonomously on the public roads will require sensors to measure the distance to nearby vehicles. This information can be used by the central computer to determine the relative location of not only the sensing vehicle but other nearby vehicles. Sensors located on vehicles may also be used to locate vehicles relative to fixed markers in the parking facility, the generally available Global Positioning System or a local positioning system.

Sensors located in the array facility may be used to locate vehicles by sensing the vehicles or markers placed on the vehicles. The communication system that connects the central computer may incorporate signals, circuits or devices to measure the location of the transmission of the signals from a vehicle and may pass that information to the central computer.

A communication system is provided to allow the central computer to communicate movement information to vehicles. The system can be part of a vehicle control network operating only in the area of this parking system or can be a usage of a wider area communication system. The system in some implementations is one way and only delivers information to the vehicles; but in many implementations it works in a bidirectional mode and delivers information from the vehicle. This information can concern the location of the vehicle, the location of other vehicles, the status of commands being received or acted upon or other data.

Vehicles are visualized as being in columns placed in a parking area. Columns of vehicles are single vehicles or vehicles placed end to end or, equivalently, in tandem. Many of the vehicles in these columns are placed with other columns of vehicles placed sufficiently closely to prevent vehicles from leaving the column except at the ends of the columns. A selected vehicle in the interior portion of a column is moved closer to an end of the column for access by moving a vehicle from the end and moving the selected vehicle and any vehicles between the selected vehicle and the end toward the end. The removed vehicle can be moved to the other end of that column or to an end which has been opened in another column by moving vehicles in more than one column.

Many parking areas in this system will have space at the ends of the columns to allow movement of the vehicles. This space may form an aisle to allow exit of vehicles or may be only available for longitudinal movement of vehicles in the columns. Exit can be by a vehicle turning into such an aisle or by means of a temporary aisle.

If a column or multiple adjacent columns of vehicles are parted by moving vehicles toward the ends of the column a temporary aisle may be formed. Temporary aisles can allow access to the front or rear of vehicles adjoining the aisle and be used for loading or unloading groups of vehicles as well as for access to remove the vehicle from the array.

First Description of Embodiments in the Figures (FIGS. 1-5)

The vehicle depicted in the several figures is dimensioned with values based the 2012 Toyota Prius, which is a specific common car in the marketplace. Various other vehicles from small model cars to large trucks could be used in similarly structured embodiments. Because this parking system is for specially designed vehicles, it is more appropriate to base the embodiment on a specific marketplace vehicle than on the American Association of State Highway and Transportation Officials recommended vehicle commonly used for roadway design. The nominal space requirement is 16 by 8 feet, but in various embodiments many other sizes and types of vehicles may be used. The arrays shown may be for very small vehicles, perhaps used for autonomous vehicle delivery systems, or for very large vehicles where the space savings of this approach represent substantial areas for each vehicle.

FIGS. 1-3 described below show the progress of one step of a cyclical shuffle, which will, when an additional similar step is completed, bring the selected vehicle 20 to the aisle 24 for access or exit from the array.

Referring to FIG. 1, a parking area is shown defined by walls 22 with four openings 23 for entrance or exit and two aisles 24. An array of vehicles 21 is shown with 6 columns 25 and 5 vehicles in each column. One of the vehicles 20 is marked with an "X" on its roof to designate that it is the selected vehicle for an access operation.

Referring to FIG. 2, a maneuver which forms one step of a cyclic shuffle us underway. Two vehicles 26 have left their columns and each is proceeding toward the column left by the other on the opposite end from the exiting vehicles departure. Completed and anticipated paths are shown as 27. The remaining 4 vehicles in each affected column have moved forward by a little more than one half of a vehicle length. In all 10 vehicles have moved, preferably at the same time and without need for a driver to access each vehicle.

Referring to FIG. 3, the maneuver of FIG. 2. is completed. The two vehicles 26 which are changing columns have arrived in their new positions. The remaining vehicles in the columns have moved forward the rest of the vehicle space length to be in new spaces. The selected vehicle 20 is one space nearer to the end of the column.

It may be appreciated that the vehicles are drawn in FIGS. 1-3 facing the direction in which they are to move. This is show more clearly the intended direction of movement in the maneuver being depicted. Because most vehicles are a capable of moving in reverse as in a forward direction; the direction the vehicle faces may not be material and may vary at random in the actual array of many implementations.

Human operation of vehicles is much more convenient in the forward direction, but this may not be so for autonomous operation.

Referring to FIG. 4, an array of vehicles is shown with five columns 31 parted by moving a portion of the vehicles toward each end wall of the parking area splitting each column into two columns 32 with a temporary aisle 33 between the new columns. The vehicles are moved into the space of end aisles 24. There is a side aisle 36. A selected vehicle 20 is now accessible and is shown exiting the array by the side aisle and by path 32.

One important advantage of creating a temporary access aisle in the manner of FIG. 4 is that this aisle allows access to all of the vehicles along the aisle for adding cargo. All of the vehicles in the array can be quickly loaded in this way in preparation for rapid departure at a scheduled time. One such accessible vehicle 34 is shown with its rear cargo door open. In FIG. 4 the vehicles adjoining the temporary aisle are shown pointing in directions which access to the rear of each vehicle is allowed from the temporary aisle 33 if that aisle is extended through the four unparted columns 30. Additional temporary aisles could be created, one at a time, at locations 35 to allow access to additional columns of vehicles. All of the vehicles could be accessed for loading and unloading in three setups created by moving groups of vehicles. This would allow, in a preferred embodiment and usage, efficient loading of delivery cargo for rapid dispatch.

Referring to FIG. 5, the array of vehicles has been expanded with an additional column 37 and the temporary aisle 33 is now shown as a diagonal. The side access aisle (36 of FIG. 4) is no longer available. This still allows a vehicle path 27 for the vehicle selected for access to the exit 23. This extreme packing of vehicles shows the use of these methods in situations where additional space is at an extreme premium value. FIG. 5 also illustrates an advantage of the precision and reliability available in suitably designed automated vehicle movement because the spaces between the parted vehicles are narrow and require serpentine movements to thread the selected vehicle out of the parking array.

Second Description of Embodiments in the Figures—4 by 4 Parking Area (FIGS. 6-11)

Referring to FIG. 6 a small parking area is shown. It can be for a small business with a very limited allotment of parking space. There is a parking array 41 of two columns each holding two vehicles with very small spacing between the vehicles and the walls 22. A walkway 42 brings a vehicle user 43 to call for a selected vehicle 20. The selected vehicle is blocked by vehicle 40. All of the vehicles in FIGS. 6-8 are autonomously driven vehicles which can communicate with each other via a local or global network. Vehicles parking in array 41 are required to accept these communications and to cooperate in the execution of the method herein described. The sensors and computer in each vehicle are sufficient to handle the details of maneuvers in tight spaces. The driver desires to access the selected vehicle.

Referring to FIG. 7 the vehicle user 43 of FIG. 6 has called for the selected vehicle with a device communicating over the network associated with the vehicles or otherwise reaching the selected vehicle. This can be done with a fixed callbox located at a convenient point or with a personal device carried by the driver. In the illustrated case a computer in the selected vehicle assumes the role of a central computer as herein described. The central computer takes information from the sensors of the various vehicles in the parking array via the network and forms a model of the locations of the vehicles. It then forms a list of movements to be performed and transmits the relevant movements over the network to the vehicles that need to move. Blocking vehicle 40 and selected vehicle 20 in accordance with movements in the list move over path 44 to position the selected vehicle to exit the parking array Referring to FIG. 8 the process of FIG. 7 is completed with the selected vehicle 20 in position to be entered by the user and the blocking vehicle returned to the array. The array now has a vacant space to accept a new vehicle if one comes along. It can be seen that this process requires coordinated control of multiple autonomous vehicles because of the need to move multiple vehicles from inaccessible locations.

Referring to FIG. 9, a block diagram of the overall components of a system implementing this embodiment and others is shown. This diagram assumes that the central computer is separate from the vehicles being controlled. Requests for access 100 are received from a user of the system by a central computer 101 tasked with coordinating the movements of the multiple vehicles 102 in a array of vehicles. Requests are processed 103 and a algorithm is applied to select a set of requests for coordinated movement. The set of requests is processed 104 into a set of simultaneous and sequential movements that bring the accessed vehicles to points where access consisting of exit, loading, unloading or other operations are able to be performed. The movements are transmitted to the vehicles over a communication network connecting 105 the central computer to each of the several vehicles.

One particular vehicle 106 is not different from the others but is singled out to show its system components. The onboard computer 107 receives the movement commands. The commands are processed in combination with inputs from vehicle mounted sensors 108 to produce specific motion command for motor, steering and other actuators 109. In the variations of different embodiments, the movement commands can be implemented at different levels. They may be indirect references to locations or geometric coordinates, absolute or relative locations, specify final locations or be broken into small steps, involve one way or bidirectional communication and be either open or closed loops.

An important group of embodiments concerns those where a network of sensors in the vehicles provide position information, where one or more of the vehicles assumes the role of the central computer or both of these are implemented. Referring to FIG. 10, a vehicle 106 is singled out from the vehicles of the array. The vehicles of the array 102 have local sensors 108 which can sense information about their position relative to other vehicles or to markers in the parking area. The vehicles have actuators for movement and steering 109.

The vehicle 106 is to take on the role having the central computer to control movements of itself and other vehicles in the array. One or more requests 100 are received to access one or more vehicles in the array. The computer of the selected vehicle 120 has or creates a model of the locations of vehicles and the parking area, which can be in various embodiments built from information acquired from local sensors, from outside sources or, here especially, from the local sensors of other vehicles in the array. This information is delivered over a communication network 121 from the other vehicles in the array. The central computer located in the singled out vehicle performs the steps of FIG. 11 and send motion commands 122 to the other vehicles over the same or another network of communication links.

Referring to FIG. 11, a diagram of the relationship between the steps in accessing vehicles is shown. Requests 100 are received and handled by a process in the central computer to create a list 110 of outstanding requests. Repetition 111 is shown for this and other list creation steps to indicate that the steps are repeated whenever new input is acquired for that stage of the overall process.

The central computer generates batch request lists 112 which contain one or more requests to be accessed concurrently. An important advantage of the method herein described is that, if movements of vehicles are possible without physical interference, movements serving multiple access requests may be performed concurrently. It is also possible at this stage to identify in certain cases vehicle movements which will serve multiple requests. Very simple algorithms, such as adding requests as long as they do not require movements for multiple requests in the same columns, are sufficient to implement an effective system; but much more sophisticated algorithms would provide substantial improvements in efficiency.

Once a batch of requests 112 is assembled a process is initiated to generate a list 114 of vehicles to be moved to accomplish the goals of the batch of requests. In one embodiment, the list consists only of final positions of vehicles that are in position for access. The control is then passed to a process that generates a list of movements of both the vehicles to be moved to access positions and of other vehicles that must be moved in order to accomplish that goal. A highly important part of this step is to break the movement pattern down into time steps and to insure that vehicles do not interfere with each other in accomplishing the goal. Simple algorithms for this purpose will only do a few moves simultaneously thereby preventing interference. Highly sophisticated algorithms will be able to look ahead more steps and make many movements at the same time. A concurrent movement list 116 is generated.

The central computer then executes movements 118 to accomplish the arrangement of vehicles for access. The movements can be controlled at a finer level of detail by feedback from fixed sensors built into the parking area or from sensors in the vehicles that sense either other vehicles or markers placed in the parking area.

Third Description of Embodiments in the Figures—Small Scale (FIGS. 6-8 and 12-13)

Here, will be described an embodiment which consists of a way to use a commercially available robotics kit to build an application for the education and entertainment of the many robotics enthusiasts who buy this popular kit. The LEGO Group produces a robotics kit, trade named Mindstorms, of which the current basic model is their number 31313. Referring to FIG. 12, the first project recommended by the kit maker is a small vehicle 140 which has two powered wheels 141 operated by separate motors 142 and a third unpowered wheel 143 which is a castor and swivels freely on a pivot 144. A programmable computer 145 is included in the kit and the vehicle. It can control the motor wheels to make defined movements, take inputs from various sensors and exchange messages 146 by means of a built-in wireless facility with other nearby similar computers or an operator control.

The embodiment primarily described in this section is an implementation of the situation shown in FIG. 6 scaled to the size of this kit and employing four vehicles made from four such kits. A fifth kit provides an additional computer 147 of FIG. 12 for the human user to communicate as a remote control to register an access request. The method being described here is the way to access a selected vehicle 20 by bringing it to the location of the passenger 43 requesting the vehicle. In order to provide a simple and easily understood embodiment as many actions and elements as possible have been eliminated leaving only those necessary to the use of the concept of the invention of this situation.

It is assumed that each vehicle has an assigned parking spot and the locations of the assignments for all vehicles are in each vehicle's initial computer data.

The four vehicles are in two columns with two vehicles in tandem in each column spaced as closely as possible and are inaccessible as stored. A request is wirelessly made by a remote control by the kit user to access selected vehicle 20. The request is wirelessly received by the computer in that vehicle. An ultrasonic sensor 148, part of a kit or sold separately by the kit manufacturer, is mounted on vehicle 20 and determines that blocking vehicle 40 is present in the space behind vehicle 20. The computer of vehicle 20 assumes the role of central computer and computes a set of movements to allow the requested access. In this simple case the computation consists of selecting stored movement details from a small set of possibilities. The movement for blocking vehicle 40 is transmitted by the wireless network from vehicle 20 to vehicle 40 and the planned movements of the two vehicles 20 and 40 are executed in coordination. The vehicles move along path 44 as shown in FIGS. 7 and 8. Thus, the selected vehicle is presented for access.

Referring to FIG. 13, a flow diagram of the relevant parts of the programming is shown. The computers in the kits are delivered with a graphic programming language suitable for implantation of the diagrammed steps. A process in the vehicle to be selected begins 160 and encounters a block 161 which waits for an access request. A user 162 uses the fifth computer to send a message 162 which is received by the waiting block 161. When a request is received the program flow goes to a decision block 164 which uses the ultrasonic sensor (148 in FIG. 12) to check for the presence of a blocking vehicle 40 behind the selected vehicle 20. Because vehicles have assigned spaces the program in the computer for vehicle 20 can assume the only blocking vehicle possible is vehicle 40 in the space behind vehicle 20. If a vehicle is detected a block 165 is executed that splits the program flow into two concurrent flows, one to make movements of the computers own vehicle 20 and one to send a message to vehicle 40. The first flow executes two movements 166 of vehicle 20. If the sensor check block 164 has not found a vehicle behind the original single program flow rejoins to execute these movements. This first flow then loops or stops 167 depending on the programming for other actions that are not relevant here. The second flow of the concurrent flow set executes a block 168 which transmits a message 169 to vehicle 40 and then stops 170.

Referring again to FIG. 13, a flow diagram of the programming for blocking vehicle 40 is shown beginning at 171 and encountering a block 172 which waits for the message 169 to execute movements. The first rearward movement is coordinated by the message with the rearward movement of the selected vehicle 20. The second forward movement may be accompanied by a delay to allow selected vehicle 20 to be out of the way or could be coordinated by a front ultrasonic sensor similar to the rear facing sensor 148 used by selected vehicle 20. The blocking vehicle program then stops 174.

Fourth Description of Embodiments in the Figures— Ferry Loading (FIGS. 14-15)

Central computer and network movements can also be used to improve time, effort and space efficiency in loading a parking area with vehicles as well as in accessing vehicles. An embodiment of the current invention for that purpose is now described.

Referring to FIG. 14, the deck 200 of a vessel to carry a cargo of vehicles is shown. The shape is interrupted at several points for vehicle structure 201 and operation 202. Vehicles of various types and sizes have been loaded in close proximity and in numerous columns. The spacing is too close to allow an operator to enter or exit a vehicle in place. One typical driverless vehicle of each type is labeled 203. One vehicle type 204 is assumed to have a human operator for each vehicle of the type. This driver, if necessary, has exited the vehicle before a neighboring vehicle was placed. This process is less efficient than driverless loading but shows that a mixed load of driverless and driver operated vehicles can be accommodated. It should be noted that some driverless vehicles, e. g. 205, are place where complex maneuvering and sequencing are necessary in the loading process.

Referring to FIG. 15, a staging area 206 for the vehicles of FIG. 14 is shown. The vehicles have been delivered and lined up in columns for loading into the ferry. A specific area 207 is set aside for driver operated vehicles. A central computer uses a network or communication links to take control of the driverless vehicles and is acquires information about the number and dimensions and maneuvering capabilities of the driver operated vehicles and the driverless vehicles. The information could come from manual entry, from pre-established databases or from the vehicles over the communication network or links. The computer executes appropriate algorithms to compute a set of locations for placing the vehicles in the ferry of FIG. 14. The central computer transmits the locations to the driverless vehicles and coordinates the sequence of loading so that vehicles do not interfere with the loading of other vehicles. Locations of allowed areas for vehicles to enter or cross in reaching may be transmitted to vehicles to augment or replace information vehicles acquire from their own sensors.

The driver operated vehicles 204 leave their staging area 207 when called by a suitable communication means for drivers. This may be as simple as loudspeakers or may consist of a small device given to each driver to display directions for that specific driven vehicle. Drivers may be required to place their vehicles in specific places on the ferry. The places may be marked on the ferry or relative to other vehicles or designated by the direction display devices. The loading of driver operated vehicles may be before, interspersed in or after the loading of driverless vehicles.

Fifth Description of Embodiments in the Figures—Two by Two Area Loading (FIGS. 16-18)

The vehicles and layout of FIGS. 6-8 and 12-14 are used to show an additional embodiment. In this as well as embodiment descriptions two and three, the layouts of FIGS. 6-8 and 16-17 are intended to show both full size vehicles in some embodiments and small vehicles built from the robotics kits in other situations. The movements are the same in both cases but the vehicles and scale of the parking areas are different. The detailed description below is for a small scale implementation, but it will also show the movements and operations of an implementation with full scale vehicles. It will show the loading or parking of the small scale vehicles into a small four vehicle parking area. Small scale vehicles are built from the kits described in the third embodiment description and shown in FIG. 12. The programming of the central computers in these vehicles is shown in FIG. 18.

Referring to FIG. 16, a vehicle 210 is moved to an arrival space 212 with a fixed location incorporated in the programming of that vehicle. Because the parking spaces for the vehicles are pre-assigned, the program for arriving vehicle 210 can assume that the only blocking vehicle 40 must be considered in reaching the assigned space. The locations of the vehicles and the set of movements here required are pre-computed in the assignment of spaces and incorporated in the programs of the two vehicles involved. This pre-computation is accomplished in a separate computer which makes blocks of programs or data base entries to be stored in the central computer executing or commanding the movements. The pre-computation considers vehicle count, type, dimensions and capabilities. Blocking vehicle 40 has in its computer a variable with three states: absent, changing and present. Arriving vehicle 210 transmits a query to blocking vehicle 40. If the answer "changing," arriving vehicle 210 waits as necessary while repeating the query. If the answer is "present," the arriving vehicle's computer takes the role of central computer and transmits a message containing information requesting a movement to the blocking vehicle 40. Blocking vehicle 40 moves backward along path 213 out of the way of arriving vehicle 210. Thereby, executing the movement requested.

Referring to FIG. 17, the arriving vehicle 210 executes a movement in the set of movements and moves along path 214 into its designated space 211 (shown in FIG. 16). Then, in coordination as established by the program in the central computer in the arriving vehicle, the blocking vehicle executes the final movement of the set of movements and return to its designated space along path 215. The vehicles are now arranged as shown in FIG. 6 as required.

Programming steps for the vehicle computers for this embodiment are shown in the depicted diagrams of FIGS. 18 and 19. These programming steps have been compiled by a computer by an algorithm to generate appropriate steps for each combination of arriving and parked vehicles taking into account the geometry and dimensions of the parking area, the assigned spaces and the vehicles involved. Different program steps are stored in different vehicles as necessary. The program fragment for the arriving vehicle 210 is shown starting at 220. This is to occur when the vehicle arrives at the arrival space 212 of FIG. 16. The program immediately enters a query block 221 and repeats the query until an answer other than 'changing' is received to a query 222 made over the communication network or links to potential blocking vehicle 40. This insures that the blocking vehicle is either out of the way or ready to accept a command to move out of the way. If the reply is 'present' the blocking vehicle 40 must be moved out of the way. The program flow moves into a concurrent process 223 set block which allows two processes to proceed simultaneously. It, thereby, assumes in this case the role of the central computer. Interactive processes can work in either an open loop mode as does the next step where a commanded partner is assumed to perform a commanded step after the appropriate time or in a closed loop mode where a command is followed by monitoring for confirmation of completion. A concurrent block 224 is executed transmitting the message 225 "Back Out" is from the arriving vehicle 210 to the blocking vehicle 40. The alternate concurrent block 226 is a fixed interval delay to coordinate the completion of the blocking vehicle's movement along path 213 of FIG. 16. The arriving vehicle then moves according to block 227 forward along path 214 of FIG. 17 to its allotted parking space 211. The one remaining step for the arriving vehicle 210 is to send the message "Return Home" to the blocking vehicle 40. This is done by block 228 which sends the message 229 to the blocking vehicle 40. The program then stops. If the reply to the query of block 221 is absent then flow skips to block 227 and the vehicle 210 moves directly into its assigned space because the blocking vehicle 40 is not in the way.

Referring to FIG. 19, the programming steps for the blocking vehicle 40 are diagrammed. Starting at block 240 the vehicle's computer begins a concurrent process set 241 for two simultaneous processes. The first process which loops continuously waits 242 for a query message 222 of FIG. 18 from another vehicle. When a message is received the process responds 243. Message path 222 is bidirectional and carries both the query to block 242 and the response from block 243.

The second process initiated by block 241 transfers control to block 244 which waits for a message 225 "Back Out" from another vehicle. When such a message is received control passes to block 245 where the message is executed and a movement, along path 213 of FIG. 16, is made which is coordinated by the central computer in the vehicle passing message 225 to the movements of the vehicle passing the message. The process then waits 246 for a message "Return Home" 229 which coordinates the movement 247 of the blocking vehicle back to its assigned space along path 215 of FIG. 17. The process then stops at block 248.

In general, detailed description after this paragraph is added in this application to description in the parent application.

Description of Operations in a Simple Embodiment

Referring to FIG. 20, a situation where multiple lanes 321 of autonomous vehicles 320 is shown. The vehicles are to pass a single lane restriction 322 as quickly and efficiently as possible. The restriction could be because of a temporary condition such as road repairs or an accident or it could be a permanent restriction such as a bridge, a tunnel or a single lane mountain road. The vehicles enter a control zone 325 as they pass a zone entry facility 323. A zone entry facility can be a physical gate where checks are made and control devices are handed out, a communications based electronic point of control transfer or implemented in some other way. The vehicles are now sufficiently controlled by the zone control authority to guarantee compliance with zone rules. In this case the vehicles are formed into a straight line with minimal spacing between vehicle and moved at a high rate of speed through the single lane restriction 322. At the end of the restriction the vehicles are directed toward multiple lanes and the zone exit controller 324 restores the vehicles to their individual autonomous control.

Zone Operation Rule Messages

One category of zone operation rules is those that can be followed autonomously by vehicles once the zone control authority has communicated them to the vehicles. In most cases, the zone control authority will have procedures to check that the vehicle being admitted to the control zone can be trusted to follow the rules as communicated. Examples of rules that could be followed autonomously by suitable vehicles include designation of speed, vehicle spacing and lane selection. These are only some of the possible variables which could be governed by the rules. The particular behavior can also be conditional based on conditions that are known or sensed by the vehicles. For example, the speed requested can be a function of location and certain vehicles can be expected to know their location by GPS or other means.

The zone authority can also issue instruction messages which tell the controlled vehicle the specific rules to follow in the controlled zone.

When the vehicle leaves the control zone it is released from the control by the rule set. This can be the result of another message from the zone authority or may happen by the operation of the rule set.

Referring to FIG. 21 showing the control flow of one embodiment of the disclosed concept, the zone authority 330 issues a message 331 to an uncontrolled vehicle 332 desiring to enter the control zone, causing the vehicle to enter a controlled mode. This is a message designed to cause the vehicle to enter a mode of controlled operation to follow the set of zone rules. The vehicle becomes a controlled vehicle 333. The zone authority also issues an instruction message 334 which causes the vehicle to become an instructed vehicle 335. This message would comprise information to be used by the vehicle to follow the zone operation rules. In this first category the vehicle is then ready to be admitted to the zone and perform operations 336 autonomously in accordance with the zone rules. The zone authority may issue a release message 337 or the vehicle may be released by the operation of the zone rules and becomes a released vehicle 338 and leave the control zone.

For rules in the category above, a message setting a variable in a preestablished rule set would be a message comprising information to be used by the vehicle to follow the operation rules.

A second category of rules are those which require the controlled vehicle to respond to additional information transmitted to the vehicle by the zone control authority.

The zone control authority can provide markers and signs in the control zone which provide additional information to the controlled vehicle. These could be fixed in their content or could be changed by the zone control authority in response to conditions. They could be general in communicating the same information to any vehicle or specifically addressed to specific vehicles. They would if so intended by the zone control authority comprise a means of transmitting a message to a vehicle to cause the vehicle to enter a mode of operation designed to follow the zone control rules or a message to be used by the vehicle to follow the zone operation rules.

The zone control authority can communicate with the controlled vehicle to provide modified or continuous control to implement rules. Any type of communications link or network can be used.

Referring to FIG. 22 showing the control flow of one embodiment of the disclosed concept where continuing control messages are used, the zone authority 330 issues a message 331 to an uncontrolled vehicle 332 desiring to enter the control zone to cause the vehicle to enter a controlled mode. This is a message designed to cause the vehicle to enter a mode of controlled operation to follow the set of zone rules. The vehicle becomes a controlled vehicle 333. The zone authority then issues a stream of messages 339 to implement controlled operations by the vehicle. This stream could provide periodic instructions or could continuously control all details of the vehicles operation. A return communications path 340 could be used to make the control interactive or to report conditions and sensor data to the zone authority. These messages would comprise information to be used by the vehicle to follow the zone operation rules. In this second category the vehicle would be admitted to the zone and perform in various degrees of controlled or autonomous operation 336 in accordance with the zone rules. The zone authority may issue a release message 337 or the vehicle may be released by the operation of the zone rules and becomes a released vehicle 338 and leave the control zone.

Provision of a Communication or Operational Device

Some autonomous vehicles can receive and implement the messages using only the equipment built into the vehicles. It is expected that when a system using the disclosed concepts is widely implemented that builder of autonomous vehicles will make such provisions, but in other cases the vehicle provided communication or operational equipment will not be sufficient in itself to perform the functions. In those cases vehicles would be expected to have provisions to integrate additional devices to aid in the vehicle control. The zone operator can then provide communications and operational equipment to supplement the capabilities of the vehicle.

Referring to FIG. 23, an embodiment with a zone operator provided communication and operational device is shown. Vehicles 320 approach the zone entry facility 323 and each have a zone control device 350 attached to the middle of the front bumper. In this case all vehicles in the zone 325 have such devices provided by the zone authority. The devices are used to follow a signal emitting cable 351 embedded under the surface to guide the vehicles through the zone. In one particular version of the contemplated embodiment, the devices receive information from the cable signal to determine the location of the vehicle which is reported via the return channel (340 shown in FIG. 3) to the zone authority which issues control messages via the control message stream (339 of FIG. 3) to the controlled vehicle. This allows the zone authority to coordinate the operation of multiple vehicles to accomplish the goals of the zone operation rules. When the vehicles arrive at the zone exit facility 324 the devices are removed and the vehicles continue as released vehicles outside the zone.

Other uses of zone authority provided devices in various embodiments include transmission and reception of zone authority messages, sensing of various conditions including zone configuration and objects and other vehicles. Some devices may augment the physical capabilities of the vehicles to provide additional traction, turning abilities, attachment to zone equipment and other functions.

Integrating Driver Operated Vehicles

Zone authorities in certain embodiments of the disclosed concept would want to admit driver operated vehicles to the zone of operation. These vehicles may be subject to some or all of the zone operation rules and or may have special rules applied for their operations. A preferred embodiment showing the operation of a zone rule that driver operated cars must follow instructions on a zone authority display device and in the illustrated case follow a designated autonomous vehicle is shown in FIG. 24.

In one group of embodiments controlled vehicles 350 are interspersed between autonomous 320 or driver operated vehicles 361 which may not themselves be under the control of the zone rules. If the controlled vehicles operate at controlled speeds they can be used to control the speed of the uncontrolled vehicles by their proximity and sequence in a moving group of vehicles. This can be used both directly for safety and to damp out or eliminate undesirable variation in speed such as the accordion effect. Uniform speeds can contribute significantly to throughput even though a minority of vehicles is actually controlled.

Both autonomous 320 and driver operated 360 vehicles are entering a zone entry facility 323 for a control zone 325. Driver operated vehicles in the figure have "DRV" on their roof. The autonomous vehicles are being issued zone control devices 350 to follow a zone guidance cable 351 through the zone as in FIG. 23. Driver operated vehicles are issued a suitable control device for their use 370 shown in FIG. 25. In the situation of FIG. 24 a display screen 371 shows a control message 373. The particular message can be "follow a designated autonomous vehicle at a spacing of 1 car length. A specific driver operated car 361 is following a designated autonomous vehicle 362 in the figure.

FIG. 25 shows an embodiment of a driver control device 370 as issued to driver operated vehicles by the zone authority. It shows a display screen 371 with a message 373 showing information to be used by the operator to follow the zone operation rules. The screen is in this case on a dashboard mount 372 for driver convenience. A communication link 374 transmits the message 373 from the zone authority 330.

Zone Operation Rule Operations

Zone Operation Rule Inputs

Zone rules can take into account many different inputs, some of which are listed in this section. This list is not inclusive and other inputs are possible and contemplated. Operation of the rules typically depends on the values of these inputs.

The capabilities of the controlled vehicles is an important input. These include speeds and physical capabilities, autonomous operation capabilities, ability to sense and coordinate with other vehicles and environmental features, communication capabilities, ability to report back to the zone authority and assurances of reliability. The zone authority will in most cases tailor the admission privileges and the operation of the rules to specific vehicles to these capabilities. This tailoring can depend on both the nature of the capabilities and the certification of the capabilities as received by the zone authority.

Feedback of conditions by the controlled vehicles is an important input in many applications of these methods. This can include location relationships to other vehicles and to the zone configurations and detection of obstacles or unexpected objects or conditions.

Outside parties may give inputs to the zone authority to affect the operation of the rules. For example, if a zone authority can direct or restrict manner, place or time of controlled vehicles leaving the zone, it may do so in response to a request from the zone authority of a different and downstream zone authority. If a stream of vehicles leaving the zone is limited by outside conditions, then the zone authority may decide that the costs and risks of maximum throughput are unnecessary and slow vehicles within the zone.

The zone authority can operate sensors for conditions inside the zone and use information gathered from them to control application of the rules.

Zone Operation Rule Functions

In many embodiments of the disclosed invention the zone rules are used to coordinate the simultaneous operation of multiple vehicles in the zone. Zone rules can also be used to control the locations, paths and speeds of vehicles and to insure that markers in the zone are sensed and used appropriately.

An important function of zone rules in various embodiments is to control the speeds in coordination with the relative location of vehicles to each other and to the configuration of the controlled zone. For example, in FIG. 23 the purpose of the zone may be to get the controlled vehicles 320 which are already under the control of a guide device (buried signal cable) 351 through the zone as quickly as possible and to optimize the number of vehicles passed through the zone. Both the speed and the relative location are important to give the fastest possible throughput.

The zone rules can take into account several factors to make an effective optimization. These include the reliability and accuracy of control of each type of vehicle, the configuration of the exact part of the control zone being traversed by the vehicles and conditions sensed by vehicles and by control zone sensors. The optimized solution may vary based on the risk level to be permitted and the current need for vehicle throughput; that is, if there is no current need for high throughput due to either low traffic levels or the current area not being a determinate of throughput, then slower speed can be commanded. While a goal of the optimization would be maintaining a low risk of crash or other problem, some risk would always remain and it becomes an optimization variable; as are all goals.

In many embodiments zone operational rules are concerned with security concerns. The controlled vehicles can be allowed to use their own rules or be operated by their own drivers but the zone rules can override these to make specific areas off limits. The security areas can be varied by the zone authority both by time and by the particular vehicle or mission being controlled. Another advantage is that the zone operator does not need to reveal zone security rules except to the extent made necessary in the act of zone rule enforcement.

Zone security rules may involve checkpoints. A rule may direct a vehicle to a checkpoint or may take into account the existence or nature of a checkpoint clearance.

The control zone may have multiple exits. A function of the control rules can be the selection of the exit to be taken by a particular vehicle. For example, a control zone could consist exclusively of the entrance to a tunnel with waiting areas and not include the tunnel itself. If the tunnel has multiple tubes, the control process could handle sorting vehicles by type or potential speed or separation for safety of dangerous loads from each other or from passenger vehicles; e.g. the vehicles in front of or behind a load of flammable liquids could be limited to trucks with low fire risk and not other trucks of flammable liquids or busloads of people. Another use in the case of a multiple tube tunnel entrance is balancing the load of the different tubes.

The tunnel example of an embodiment above is one example of the sorting and priority uses of zone rules. There are many other uses than safety including mission priority, expedition of Very Important Persons, reduction of weight concentration on bridges and the elimination of bad sequences such a one car between two semitrailers.

The zone operation rules may be integrated with the mission of the vehicle being controlled. For example, if a controlled vehicle is too provide something or some service within the control zone then requests for that service may be processed along with the zone operation and the zone authority can send the controlled vehicle to the place where the service is needed. This can be the main purpose of the zone, but another example is of a secondary purpose. If the control zone is a multi-lane limited access highway, then one type of controlled vehicle could be emergency and towing vehicles belonging to the zone authority itself. Those vehicles could be dispatched in an integrated manner with to handle needs that arise in and are reported by the zone operations.

In most embodiments the zone authority will want to be tracking the controlled vehicles in a substantial level of detail. This can be accomplished through the zone rules directly; e.g. having a specific rule require vehicles to report location or sensed circumstances. It can also be accomplished by zone facilities such as sensors provided by the zone authority in combination with information from application of zone rules or assumption that vehicles will be following zone rules.

Parking situations are involved in some of the most important embodiments. Any of the embodiments of the parent application and FIGS. 1-8 and 14-17 can be implemented with the inclusion of zone control as described.

Parking Areas as Controlled Operation Zones

The parking areas of FIGS. 1-8 and 14-17 can be controlled by a zone authority by the methods disclosed herein. A controlled operation zone with a system of operation rules is established by the zone authority with control of the parking area, and a message is sent to autonomous vehicles entering the area which causes them to enter a mode of operation designed to follow the rules. The zone authority then sends additional messages which for part of the information that determines and coordinates the operation of multiple controlled autonomous vehicles in the controlled operation zone.

For an example of using controlled zone operations in parking autonomous vehicles consider FIGS. 6-8 which describe an operation of removing a vehicle 20 from a small parking area. The entire area pictured in the figures is the controlled operation zone and vehicles are taken under control as the enter the area. The operations and movements of the vehicles themselves described in the section above headed "Second Description of Embodiments in the Figures—4 by 4 Parking Area" The zone authority executes the operations by issuing messages to be used by the controlled vehicles to follow the operation rules.

Indoor Areas as Controlled Operation Zones

Indoor driving areas can provide situations where control of vehicles by the disclosed methods is suitable. There are indoor loading docks in the basements of many multi-story buildings in built up areas in situations like urban department stores. Operation of larger vehicles such as semi-trailers in these areas is difficult and risky. Referring to FIG. 26 such a situation is illustrated. An inside loading dock area 380 is shown with a loading dock 381 having several bays 382 for vehicles. Obstructions 380 make maneuver in the area difficult and risky. Autonomous vehicles 320 enter through the zone entry facility 323 and receive messages or devices that place them under the control of the zone authority. (See FIGS. 20 and 25). One particular autonomous controlled vehicle 384 has entered in a forward motion and been placed under zone authority control. This vehicle has turned around and is in the process of backing along path 385 to the last remaining open bay. With the obstructions this operation would be very difficult with a human driver and almost impossible with the built in facilities of many autonomous vehicles, especially with the variety of capabilities that delivery vehicles from diverse suppliers arriving at a general loading facility would have. The zone authority controlling the movements with a stream of commands would have built in provisions to handle the special conditions of the control zone. In addition the zone authority can coordinate the movements of other vehicles in the zone including both those at loading bays and other vehicles that may be coming and going at the same time. Vehicles at the completion of operations in the control zone leave through a zone exit facility 324 which is at the same location as the zone entry facility in the illustrated situation.

Secured Areas as Control Zones

Areas where entrance is controlled but the security requirements vary from place to place provide another type of control zone suitable for this methods of this disclosure. Referring to FIG. 27 a campus for a small secure facility which constitutes a control zone 325 is shown. The zone authority has set up a zone entry facility 323 and a zone exit facility 324. Different vehicles are controlled with different destinations within the campus. The control of the vehicles is assumed to be both by the vehicle operators and the zone authority but the control of the zone authority constrains the controlled vehicles from entering specific secure areas 390 and 391 which are hatched in the drawing. The rules are varied for different vehicles. For example, employee passenger vehicles 392 could be allowed to enter the specific security area where the employee works 390 but not other secure areas 391. A checkpoint 392 is shown. Vehicles entering the control zone can be taken to the checkpoint for inspection before they visit other areas. The result of a checkpoint inspection can be taken into account.

I claim:

1. A method of moving autonomous vehicles in a parking area wherein the vehicles comprise a plurality of columns, at least two columns are spaced too closely to allow access to a vehicle by a driver, and at least two vehicles are in a tandem arrangement in a column; comprising:
   computing a set of movements of a plurality of vehicles with a computing device to be executed in a time sequence wherein each movement is determined not to have any vehicle interfere with the motion of any other vehicle,
   transmitting a plurality of movements from the set of movements to at least two vehicles to be moved, and
   autonomously moving at least two vehicles in a coordinated manner in accordance with the transmitted movements.

2. The method of claim 1; further comprising:
   performing a cyclical shuffle of the vehicles in a plurality of columns with each column comprising a front and a back; wherein
   the cyclical shuffle comprises:
   moving at least one vehicle from the front of one or more columns,
   moving at least one remaining vehicles in one of the columns forward, and
   placing a vehicle removed from a column at the back of one of the columns.

3. The method of claim 1; further comprising:
   accessing a vehicle from a temporary aisle.

4. The method of claim 1 wherein:
   a first vehicle is removed from the columns of autonomous vehicles,
   a second vehicle is subsequently added to the columns of autonomous vehicles to occupy a space previously occupied by a vehicle of the columns prior to the removal of the first vehicle.

5. The method of claim 4 wherein:
   a vehicle in a column is autonomously moved to create a space between two vehicles in the column to allow a vehicle in another column to exit the parking area.

6. A method of accessing a particular vehicle in an array of autonomous vehicles with a plurality of columns of vehicles wherein the columns are spaced too closely to access at least one vehicle in the array and a plurality of vehicles are in a tandem arrangement in at least one column; comprising:
   receiving a request to access the particular vehicle;
   computing a set of movements of a plurality of vehicles with a computing device to be executed in a time sequence wherein each movement is determined not to have any vehicle interfere with a motion of any other vehicle;
   transmitting movements from the set of movements to at least one vehicle to be moved; and
   executing the movements in the set wherein a plurality of vehicles is autonomously moved in a coordinated sequence determined by the set of movements.

7. The method of claim 6 further comprising:
   moving a plurality of vehicles simultaneously.

8. The method of claim 7 further comprising:
   producing a measurement with a sensor in a vehicle of a relative distance between two vehicles; and
   employing the measurement in computing the movements in the set of movements.

9. The method of claim 6; further comprising:
   performing a cyclical shuffle of the vehicles in a plurality of columns; wherein the cyclical shuffle comprises:
   moving at least one vehicle from the front of at least one column,
   moving at least one remaining vehicle in a column forward, and
   placing a vehicle removed from a column at the back of a column.

10. The method of claim 6; further comprising:
    performing an open shuffle of vehicles in a plurality of columns with each column comprising a front and a back wherein
    the open shuffle comprises:
    moving at least two vehicles from the front of one or move columns,
    moving the remaining vehicles in the columns forward, and
    removing at least one of the vehicles moved from the front of the columns from the parking area, and
    placing at least one of the vehicles moved from the front of the columns in the back of one of the columns which comprises one of the vehicles that has been moved forward.

11. The method of claim 6; further comprising:
    accessing a vehicle from a temporary aisle.

12. The method of claim 6 further comprising:
    producing a measurement with a sensor in a vehicle of a relative distance between two vehicles; and
    employing the measurement in computing the movements in the set of movements.

13. The method of claim 6 further comprising:
    producing a measurement with a sensor in a vehicle a relative distance between a vehicle and a marker; and
    employing the measurement in computing the movements in the set of movements.

14. The method of claim 6 further comprising:
    detecting a marker with a sensor in a vehicle; and
    employing data from the sensor in computing the movements in the set of movements.

15. The method of claim 6 wherein:
    a vehicle in a column is autonomously moved to create a space between two vehicles in the column to allow access to a vehicle in another column.

16. A method of parking a plurality of autonomous vehicles comprising:
    computing with a computing device a set of locations in a parking area employing dimensions of the vehicles and dimensions of the parking area wherein the set of locations designates a plurality of columns of vehicles too closely spaced to discharge a driver from a vehicle;
    computing a set of movements of the vehicles to be executed in a time sequence wherein each movement is determined not to have any vehicle interfere with a motion of any other vehicle;
    transmitting a movement from the set of movements to at least one vehicle; and
    executing the movements in the set of movements wherein a plurality of vehicles is autonomously moved in a coordinated sequence determined by the set of movements.

17. The method of claim 16 wherein:
a plurality of vehicles is parked in a tandem arrangement in at least one column.

18. The method of claim 16 further comprising:
producing a measurement with a sensor in a vehicle of one of a relative distance between two vehicles; and
employing the measurement in computing the movements in the set of movements.

* * * * *